United States Patent [19]

Hill

[11] 4,056,186

[45] Nov. 1, 1977

[54] COIL HANDLING APPARATUS AND SYSTEM

[75] Inventor: William J. Hill, Holden, Mass.

[73] Assignee: Morgan Construction Company, Worcester, Mass.

[21] Appl. No.: 771,058

[22] Filed: Feb. 22, 1977

Related U.S. Application Data

[63] Continuation of Ser. No. 570,236, April 21, 1975, abandoned.

[51] Int. Cl.² ............................................. B23Q 5/22
[52] U.S. Cl. .................................. 198/339; 198/472; 198/583; 198/789; 214/8; 214/DIG. 8
[58] Field of Search ............. 193/35 R; 214/1 B, 1 Q, 214/6 D, 8, 18 R, DIG. 1, DIG. 4; 100/12; 198/339, 780, 472, 583, 790, 373, 789

[56] References Cited

U.S. PATENT DOCUMENTS

| 765,473 | 7/1904 | George | 214/6 D |
|---|---|---|---|
| 1,285,750 | 11/1918 | Lewis et al. | 214/18 R |
| 2,346,659 | 4/1944 | Bruce | 198/790 X |
| 2,894,518 | 7/1959 | Ryan et al. | 198/339 X |
| 3,184,079 | 5/1965 | Buccilone | 198/373 X |
| 3,548,739 | 12/1970 | Glasson | 100/12 X |
| 3,567,002 | 3/1971 | Russ | 198/789 X |
| 3,650,419 | 3/1972 | Upshur et al. | 214/DIG. 4 |

Primary Examiner—John J. Love
Assistant Examiner—Douglas D. Watts
Attorney, Agent, or Firm—Thompson, Birch, Gauthier & Samuels

[57] ABSTRACT

An apparatus and system is disclosed for receiving upstanding cylindrical product coils from a coil forming station at the delivery end of a rolling mill, and for transporting the coils along a path along which additional processing operations are performed on the coils at different locations. The apparatus includes a plurality of separately driven and independently operable roller table modules which are aligned to form longitudinally extending roller conveyor avenues. Transfer carriages are provided to laterally shift certain or these roller table modules from one to another of the longitudinally extending roller conveyor avenues. The drives for the roller table modules and the transfer carriages are all located beneath the transport level defined by the table rollers, the latter being located approximtely at the floor level of the coil handling area. Smaller coils may be carried directly on the rollers of the roller table modules, while larger coils are preferably carried on specially designed pallets.

10 Claims, 48 Drawing Figures

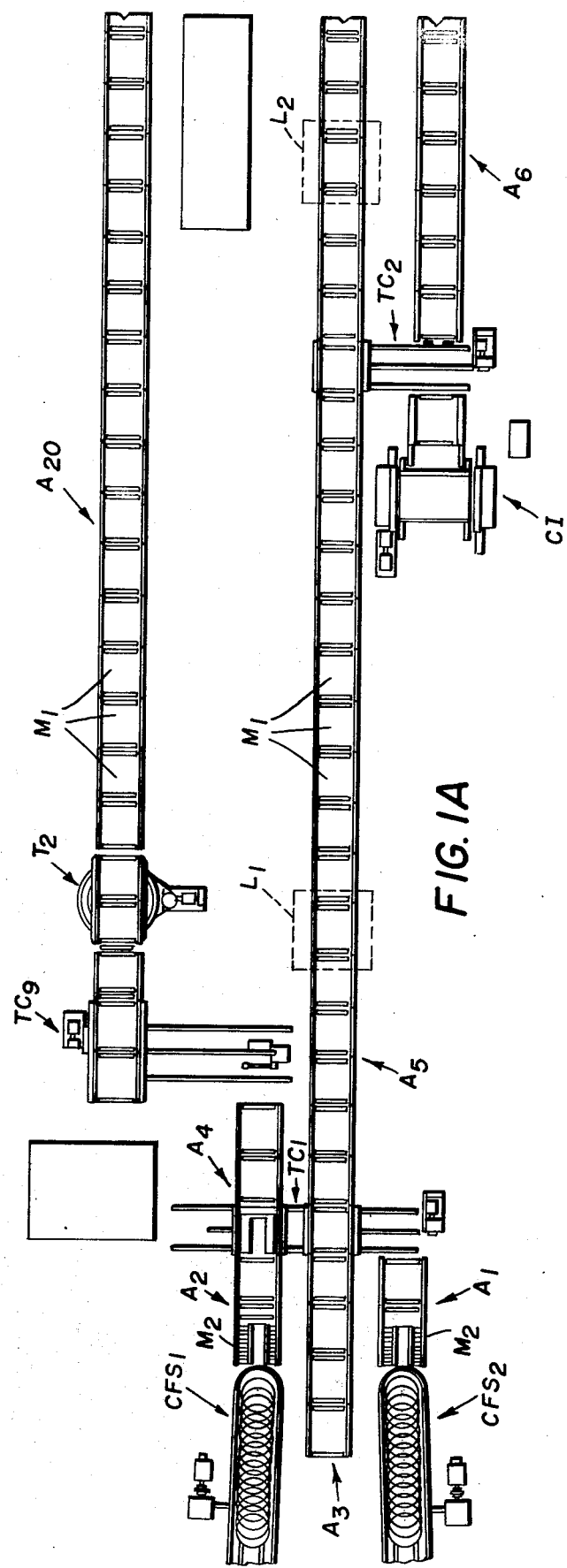

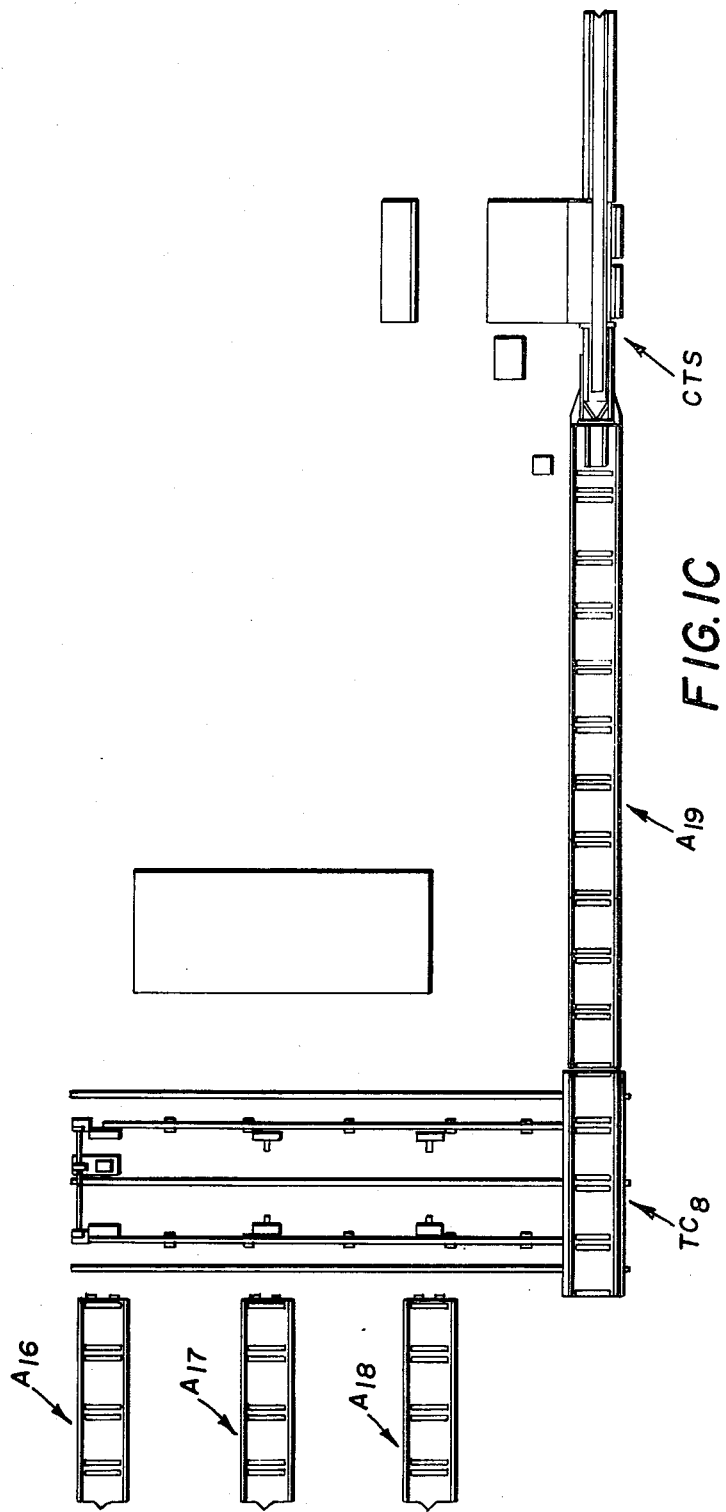

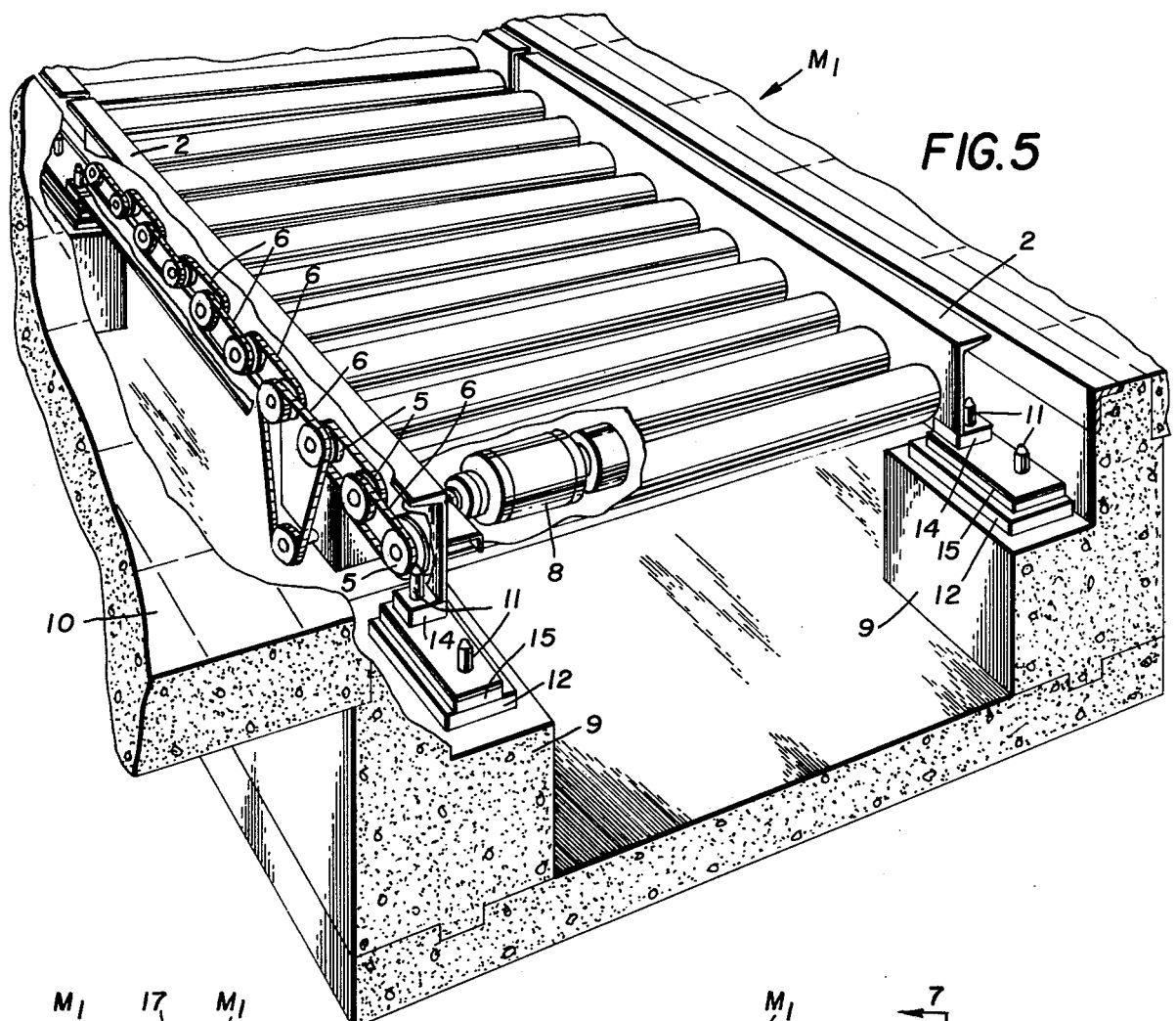
FIG.5
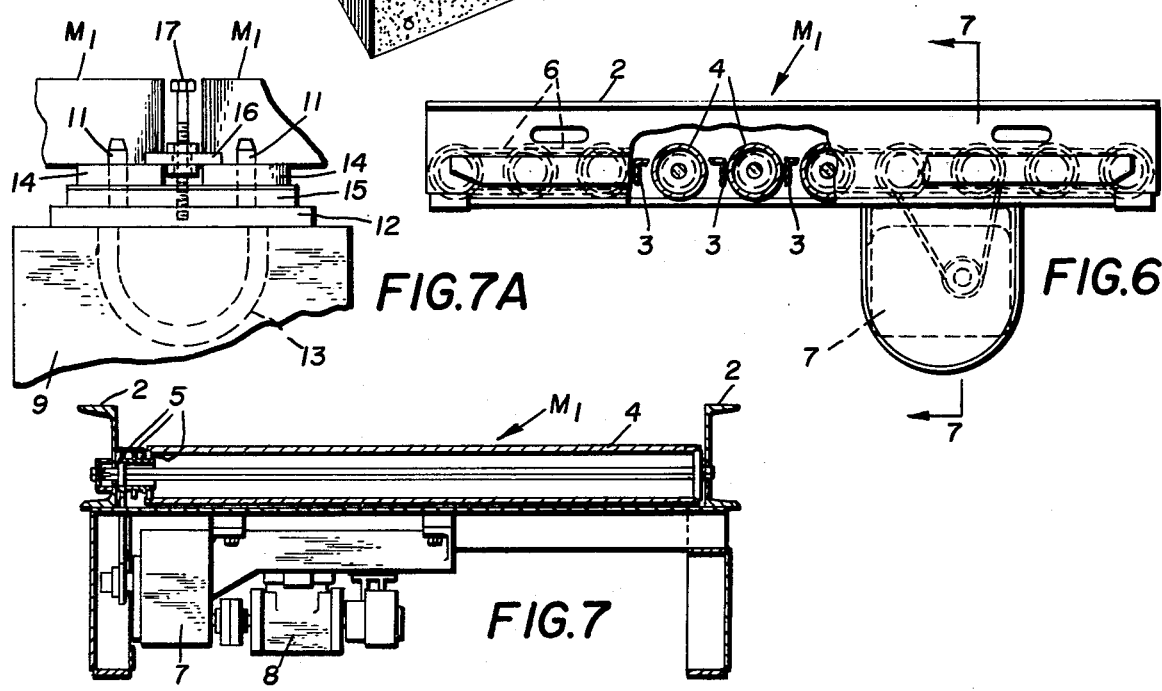
FIG.7A
FIG.6
FIG.7

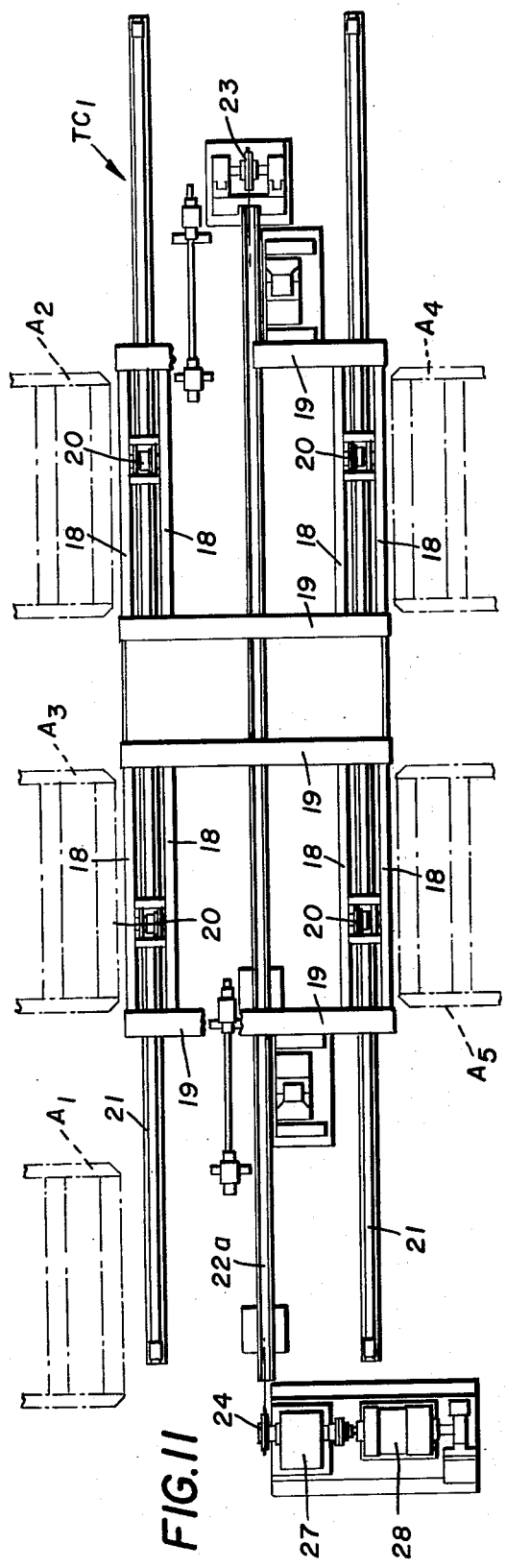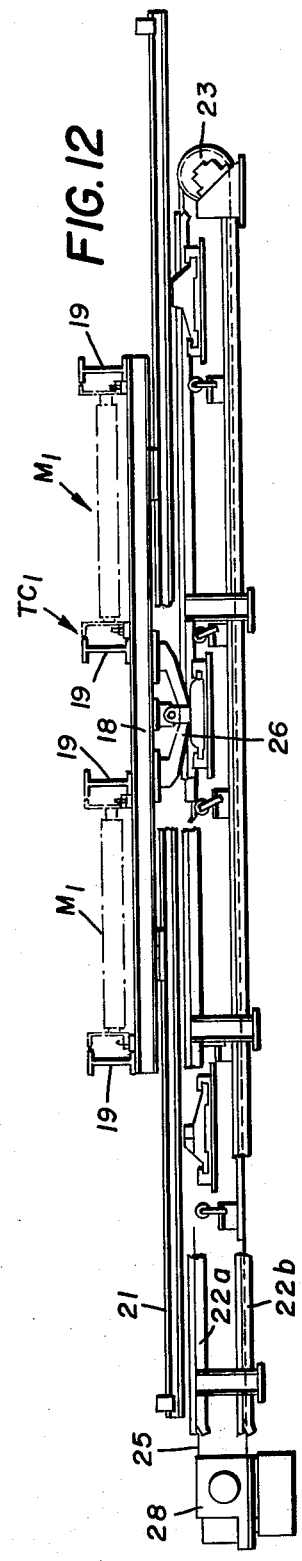

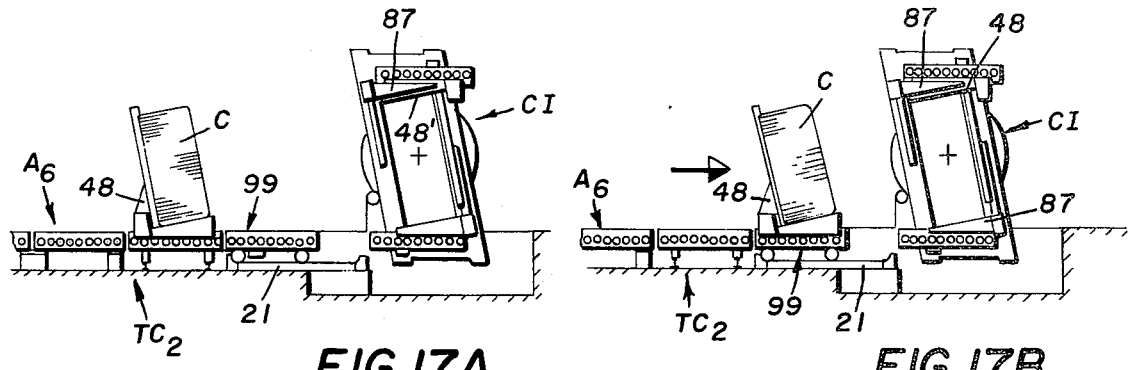
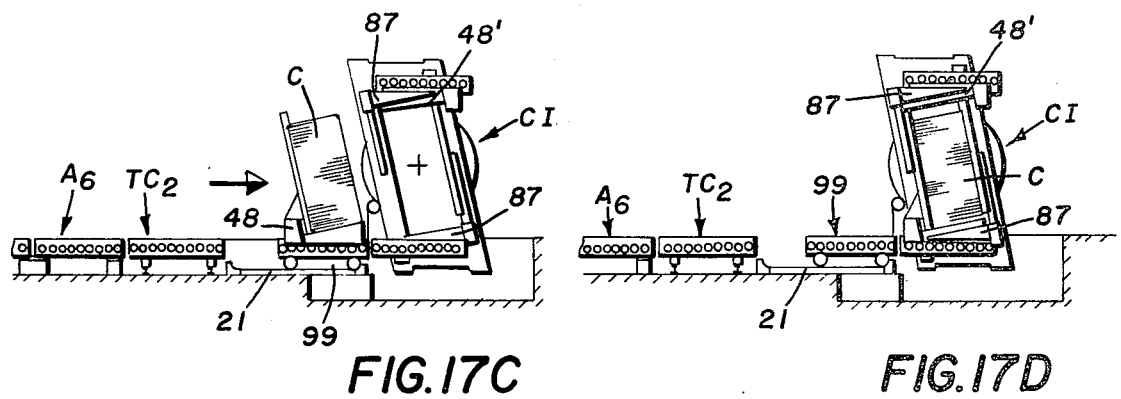
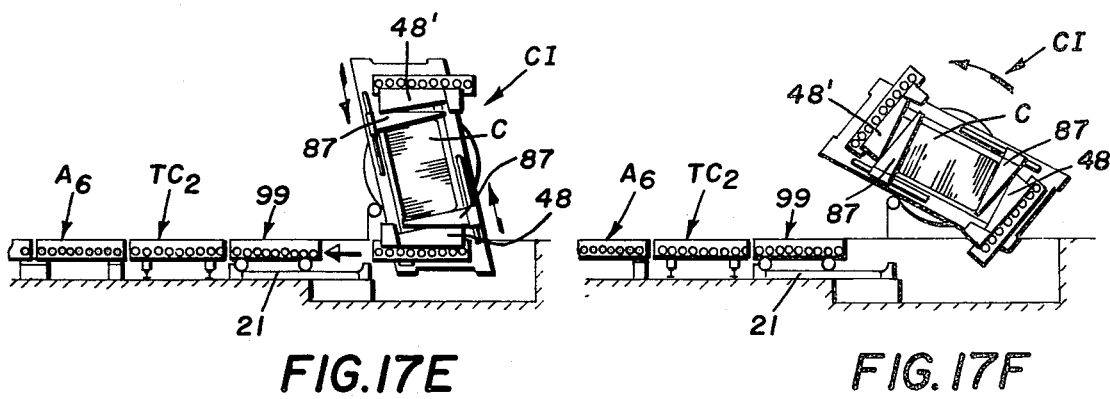

COIL HANDLING APPARATUS AND SYSTEM

This is a continuation, of application Ser. No. 570,236 filed Apr. 21, 1975, now abandoned.

BACKGROUND OF THE INVENTION

This invention relates generally to rolling mills where the rolled products are formed into cylindrical coils. The invention is concerned in particular with a coil handling apparatus and system for receiving such coils at the mill coil forming station and for thereafter transporting the coils in an upstanding condition along a path which subsequent processing operations are performed.

Historically, in earlier rod mills, rod was rolled from two-inch square billets of approximately 30 feet in length, and the resulting product was formed into coils weighing about 400 pounds. These coils, which were about the size and shape of a truck tire, were thereafter transported and cooled on standard overhead hook carriers. However, through the years, there has been a constant demand for larger and larger coils. Thus for example, today's modern rod mill can produce a coil weighing up to 4,250 pounds, whose dimensions are about 33⅓ inches I.D., 49 inches O.D., and whose height, before compacting is approximately 112 inches. After compacting, the coil height is reduced by approximately 35% to 73 inches.

In the past, it has been the practice to form these large coils vertically in a reforming tub over a core or sail. After forming, the coils are down-ended 90° from a vertical attitude to a horizontal attitude after which the coils are transferred to hook-carrier systems. Because of the size of the coils now being produced, these systems require very long and sturdy hooks, often with stabilizing rolls and counterweights to control their horizontal attitude. Due to the great height (or length) of the coils, common practice has been to arrange the hooks with their axes normal to the travel direction of the coils. Power-free motion of the hooks has proven to be necessary to permit operations such as trimming, compacting, banding and segregation of the coils while they are being transported. These complicated power-free conveyor systems, which must allow coils to gather in dense accumulations or to run independently of other coils upon demand, require massive overhead supporting structures and tracks.

The weight and size of coils produced by modern mills, when combined with the weight and size of the long carrier hooks employed to transport these coils, now threatens to overtax the load carrying capacity of the standard mass-produced overhead conveyor systems which are universally employed in industry, particularly in foundries and automobile assembly plants. As coil weights continue to increase, these conveyor systems will have to be specially designed, and this will greatly increase their costs to the mill owner. In addition, the supporting structures and rails will also undergo increases in size and costs. These massive steel structures so clutter the coil handling areas that access to coils by overhead cranes is virtually impossible. Moreover, with all of the equipment mounted on an overhead structure, maintenance becomes exceedingly difficult and often quite dangerous. Finally, as coil weights and sizes continue to increase, the danger of coil shape distortion and damage or marking of the product surface becomes an increasingly serious problem which conventional coil handling systems are incapable of coping with. All of these problems point to the need for a better coil handling system with an improved capacity to meet current and future requirements.

It is, accordingly, an object of the present invention to provide a novel and improved coil handling apparatus and system which has the capability of handling the ever increasing coil sizes of modern mills with no appreciable increase in costs for future coils of greater weight.

Another object of the present invention is to entirely eliminate the overhead structures which are common to conventional hook carrier systems, thereby allowing a clear, unobstructed area where cranes, fork lift trucks and the like can readily and safely service the product and the equipment.

Still another object of the present invention is the provision of an improved coil handling apparatus which is easiler and safer to maintain.

Another object of the present invention is the provision of a system and apparatus for handling large product coils in a manner which minimizes coil shape distortion and damage or marking of the surface of the product.

Further objects of the present invention include the provision of a system and apparatus characterized by economy in equipment, building and foundation requirements as well as improved operation and maintenance considerations.

SUMMARY OF THE INVENTION

According to the present invention, there is provided a coil handling apparatus and system which in one embodiment, includes a plurality of specially designed pellets adapted to run on a roller table complex. The pallets each have a U-shaped base with vertically extending supports. The pallets are designed to carry coils in a slightly inclined upstanding attitude. The coil pallets travel on roller conveyor avenues assembled from individually powered roller table modules, each of which controls the start, run or stop of the pallets carried thereon. This arrangement thus provides a means of carefully and closely controlling the movement of the pallets, allowing them to run independently from one location to another or to accumulate in groups and to move out individually on demand.

Broadside movement of pallets is provided by transfer cars or carriages upon which selected roller table modules are mounted. These transfer cars operate laterally between longitudinally extending conveyor avenues to shift coils from one avenue to another. Turntables are also employed to turn a pallet and coil 180° for certain requirements.

BRIEF DESCRIPTION OF THE DRAWINGS

An embodiment of the invention will now be described by way of example only, with reference to the accompanying drawings wherein:

FIGS. 1A–1C are plan views on a greatly reduced scale which when aligned from left to right, show a typical coil handling system emboding the concepts of the present invention;

FIG. 5 is a perspective view of one typical roller table module mounted in place with portions of the module and the supporting foundation structure broken away;

FIG. 6 is a side view of the roller table module shown in FIG. 5;

FIG. 7 is a sectional view taken along lines 7—7 of FIG. 6;

FIG. 7A is a partial elevational view showing one means for retaining the modules on foundation pedestals;

FIG. 11 is a plan view of a typical transfer car mechanism with portions broken away;

FIG. 12 is a side view of the transfer car mechanism shown in FIG. 11;

FIG. 17A–17K are schematic views showing the operation of the coil inverter;

DESCRIPTION OF PREFERRED EMBODIMENT a. The Apparatus and System

Figure 1B:
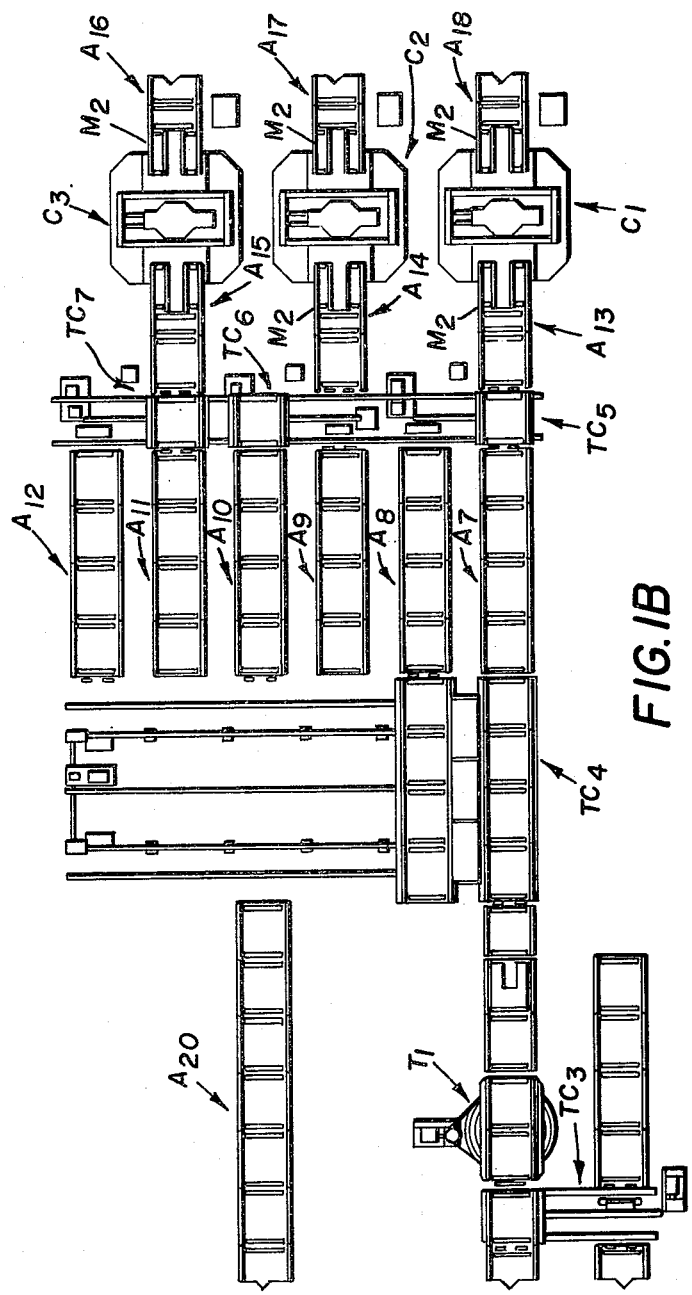
Figure 8:
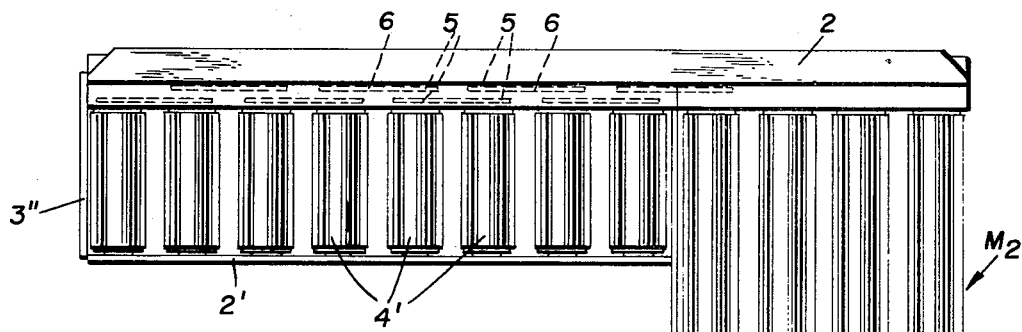
FIG. 8 is a plan view of a roller table module specially designed to accept a transfer mandrel.
Figure 9:
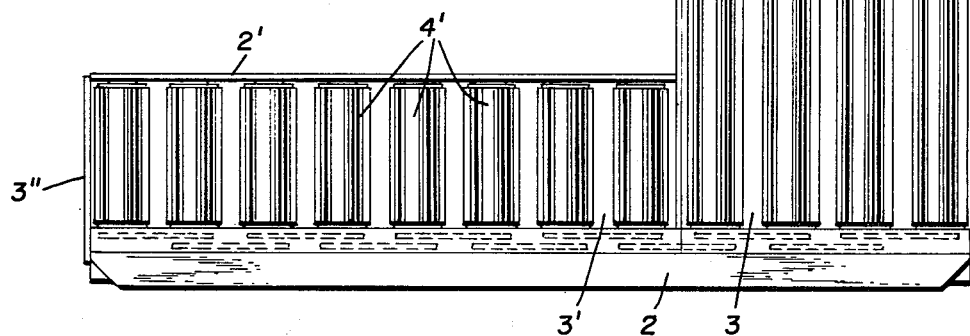
FIG. 9 is a side elevational view of the roller table module shown in FIG. 8.
Figure 10:
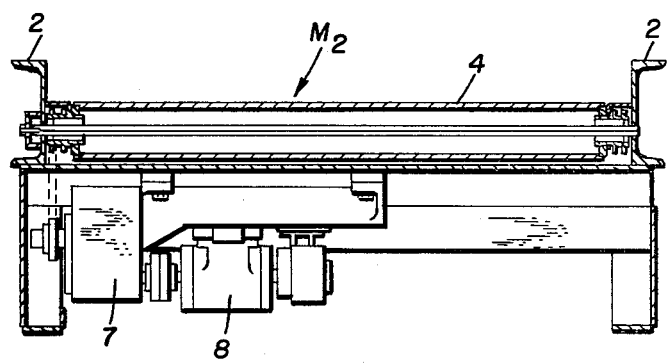
FIG. 10 is a sectional view taken along lines 10—10 of FIG. 9.

Referring initially to FIGS. 1A–1C, one embodiment of a coil handling apparatus and system in accordance with the present invention will now be described. The system begins at the rolling mill coil forming stations, two of which are indicated generally $CFS_1$ and $CFS_2$, and extends to a coil transfer station shown at CTS. The layout of the system provides for a plurality of parallel roller conveyor avenues which for descriptive purposes are identified in the drawing by the reference characters $A_1$–$A_{20}$. As will hereinafter be described in more detail, the aforesaid avenues are made up of aligned individually powered roller table modules. There are two basic types of roller table modules employed in the system, namely, those identified by the reference character $M_1$ (illustrated in more detail in FIGS. 5–7) and those identified as $M_2$ (FIGS. 8–10). The roller conveyor avenues are interconnected by laterally shiftable transfer car mechanisms which are generally indicated by the reference character $TC_1$–$TC_9$. Roller conveyor avenues $A_5$ and $A_{20}$ include roller table modules $M_1$ mounted on turntable mechanisms $T_1$ and $T_2$ respectively. A coil inverter CI is located at one end of roller conveyor avenue $A_6$. A plurality of compacting mechanisms $C_1$–$C_3$ receive coils from avenues $A_{13}$–$C_{15}$ and after subjecting the coils to a compacting and banding operation, discharge of coils to avenues $A_{16}A_{18}$.

Before providing a description of how the overall system operates, certain of the principal components referred to above will now be described in more detail.

b. Roller Table Modules

Figure 3:
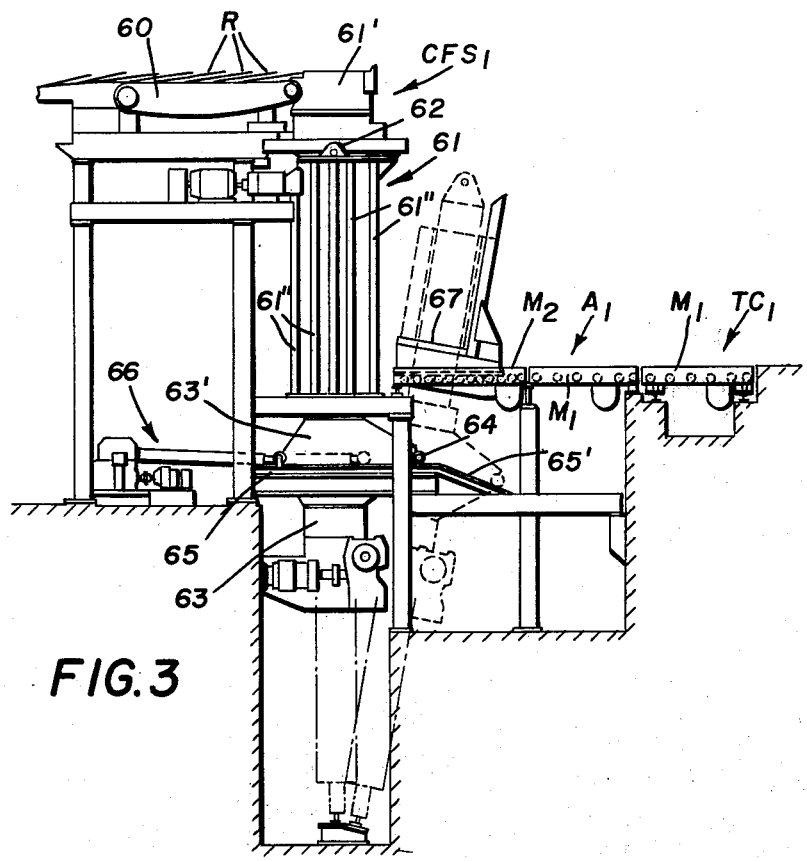
FIG. 3 is a side elevational view of a coil forming station.

With reference to FIGS. 4–7, it will be seen that the roller table modules $M_1$ have frame structures which are comprised basically of side channels 2 interconnected at appropriate locations by bridging members 3 (FIG. 3). The side channels 2 support the ends of a plurality of laterally extending parallel table rollers 4. The table rollers have either sheaves or sprockets 5 at one end thereof which are interconnected by chains or belts 6. One or more of the rolls are additionally connected by means of appropriate sprockets or sheaves and a chain or belt to the output shaft of a gear reducer 7 which is in turn driven by a motor 8. The gear reducer and motor are located beneath the table rollers 4 and are bolted to a connecting plate extending between the side channels 2.

It will thus be seen that each module $M_1$ is a self-contained unit which is adapted to be mounted at any desired location, for example on pedestals 9 which are located in a channel extending longitudinally across the floor 10 of the coil handling area. The modules $M_1$ may be conveniently located and held down on the pedestals 9 by means of pins 11 which extend upwardly from plates 12 anchored in the pedestals by embedded U-shaped anchors 13. The modules have feet 14 through which the pins 11 protrude. Preferably, resilient pads 15 are interposed between the plate 12 and the feed 14 to dampen vibration and minimize noise. The feet 14 are held down by a keeper plate 16 which is held by a bolt-nut assembly 17 threaded into a tapered hole in the plate 12.

Figure 4:
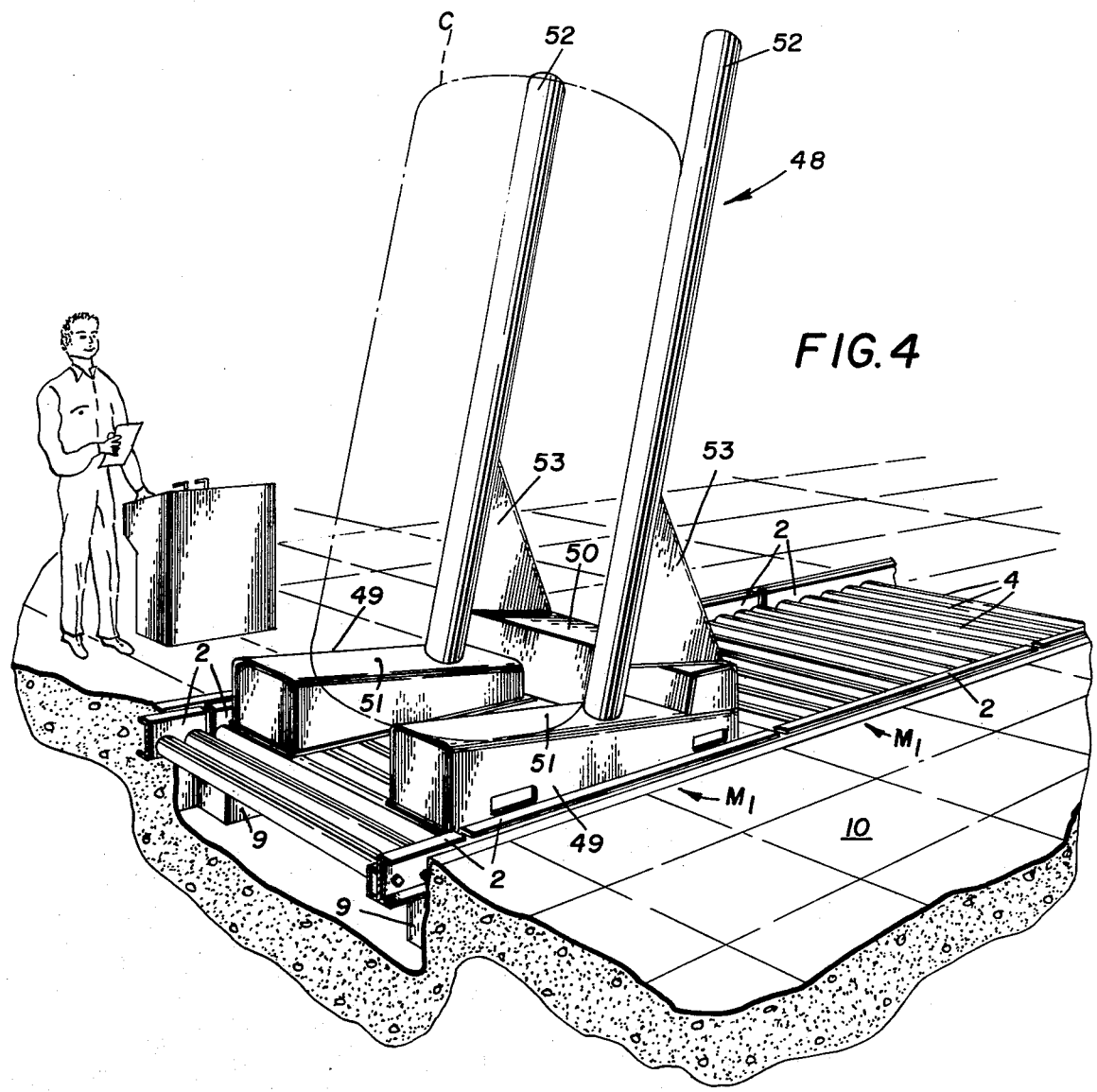
FIG. 4 is a perspective view showing a product coil supported on a pallet which is in turn supported on one of the roller table modules.

With reference to FIGS. 8–10, it will be seen that the roller table modules $M_2$ are similar to the modules $M_1$ in that the former are also provided with side channels 2 suitably interconneced by bridging members 3. Certain of the table rollers 4 extend laterally between the side members 2, while others indicated at 4' are shorter in length and extend between the adjacent side members 2 and parallel interior members 2', the latter being connected to the side members 2 by bridging member 3' and end members 3''. It will thus be seen that when viewed in plan as shown in FIG. 4, the modules $M_2$ have a generally U-shaped configuration, with an open-ended, mandrel receiving space $s_1$, the purpose of which will hereinafter be described, being provided between members 2'. All of the table rollers 4 and 4' are interconnected by a system of sheaves or sprockets 5 and belts or chains 6, with driving power againg being provided from a common underlying drive including a gear reducer 7 and motor 8.

It will be understood that the roller table modules $M_1$ and $M_2$ are adapted for mounting at appropriate positions along the path of coil travel through the coil handling area. The modules are each separately powered by means located beneath the conveying plane defined by the table rollers. The modules are adapted to facilitate their rapid interchangeability, which of course is advantageous from a maintenance standpoint. When aligned longitudinally and arranged as shown for example in FIGS. 1A–1C, the roller table modules $M_1$ and $M_2$ provide roller conveyor avenues $A_1$–$A_{20}$ which have full lateral and overhead accessibility.

c. Transfer Car Mechanisms

As previously indicated, transfer car mechanisms $TC_1$–$TC_9$ are employed to provide a means of shifting coils laterally from one roller conveyor avenue to another. One such transfer car mechanism, specifically that indicated at $TC_1$ in FIG. 1A, is shown in more detail in FIGS. 11 and 12.

Transfer car mechanism $TC_1$ has an upper frame assembly which includes parallel members 18 interconnected at appropriate locations by transverse members 19. The frame assembly further includes wheels 20 arranged to be supported on and to run along tracks 21. A chain guide having an upper open-topped section 22a and a lower section 22b is located between the rails 21. An idler sprocket 23 is located at one end of the chain guide, and a drive sprocket 24 is located at the opposite end. A chain 25 is connected at one end to a chain connector 26 which depends from the upper frame assembly. The chain runs along upper chain guide 22a, over drive sprocket 24, along lower chain guide 22b, over idler sprocket 23, and back along upper chain guide 22a where its opposite end is again connected to the chain connector 26. The drive sprocket is powered by a gear reducer 27 and motor 28. The upper frame assembly is adapted to have mounted thereon a pair of roller table modules $M_1$ (shown by dot-dash lines in FIG. 12). By suitable operation of the motor 28, the transfer car can be shifted along the rails 21 to align the roller table modules $M_1$ carried thereon either with avenues $A_2-A_4$ and $A_3-A_5$ (as shown in the drawings), or with avenue $A_1$ and avenues $A_3-A_5$.

The other transfer car mechanisms $TC_2-TC_9$ operate in a similar manner in that each runs along underlying rails under the influence of a driving arrangement which is located beneath the level of the transport plane of the roller table modules. Certain of the transfer mechanisms do, however, differ in the number and arrangement of roller table modules carried thereon. This is illustrated by the following chart:

| TC NO. | NO. OF MODULES | MODULE ARRANGEMENT |
|---|---|---|
| 1 | 2 | Double Tandem |
| 2 | 1 | Single |
| 3 | 1 | Single |
| 4 | 8 | Double Quadruple |
| 5 | 1 | Single |
| 6 | 1 | Single |
| 7 | 1 | Single |
| 8 | 4 | Quadruple |
| 9 | 2 | Double Broadside | d. Turntable Mechanisms

Figure 18:
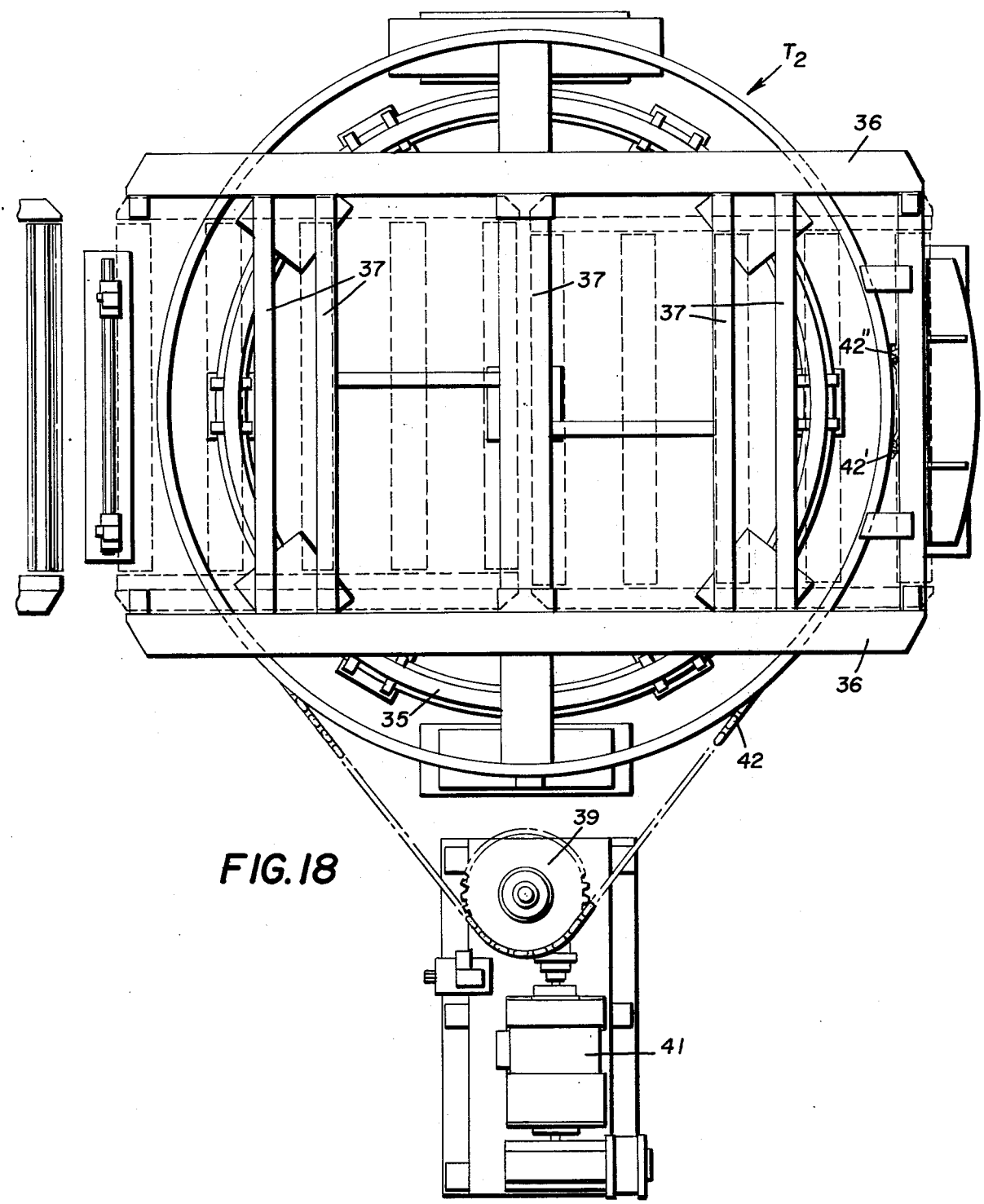
FIG. 18 is a plan view of a turntable mechanism.
Figure 19:
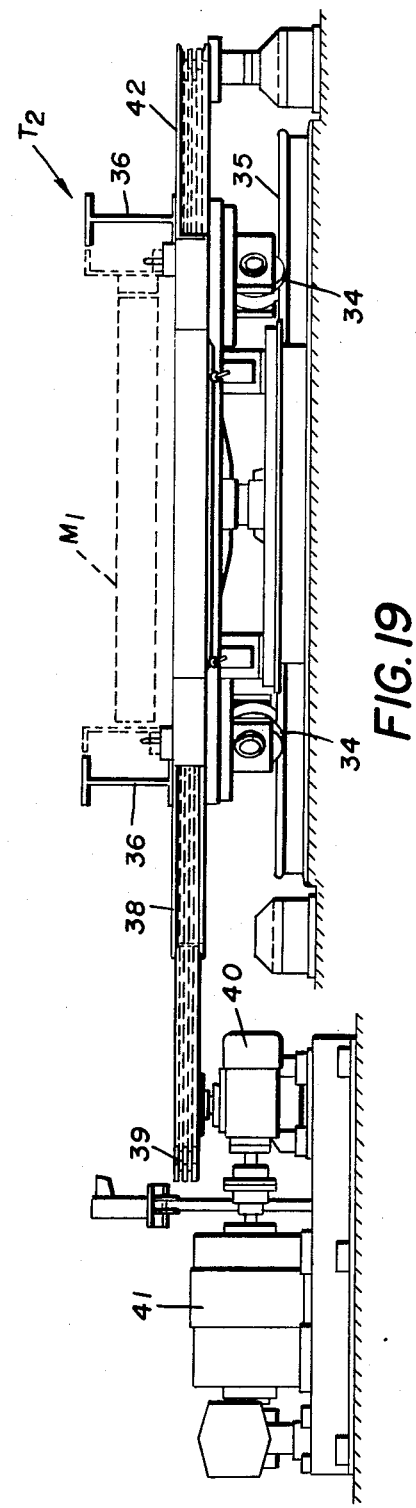
FIG. 19 is a side elevational view of a turntable mechanism.

For reasons which will hereinafter be described in more detail, it will be necessary at times to rotate coils through 180° while they are being carried on pallets along a particular avenue. In the system being employed herein for purposes of illustration, this will be required along avenues $A_5$ and $A_{20}$, and to this end two turntable mechanisms $T_1$ and $T_2$ are provided, one in each avenue. Both turntable mechanisms are constructed substantially identically, and hence only one ($T_2$) will be described in detail with further reference to FIGS. 18 and 19. The turntable mechanism includes a frame assembly having wheels 34 arranged to run along an underlying circular support track 35. The upper portion of the frame assembly includes side members 36 and transverse connecting members 37 which cooperate to support a pair of roller table modules $M_1$. The frame assembly further includes a circular chain guide 38 which is arranged at the same level as a drive sprocket 39, the latter being mounted on the vertical output shaft of a gear reducer 40 which is powered by a drive motor 41. A chain 42 has one end attached to the frame assembly as at 42'. The chain runs partially around the chain guide 38, then around drive sprocket 39, then back around the chain guide 38 where its other end is also attached to the frame as at 42".

It will thus be understood that with this arrangement, the turntable can be rotated in either a clockwise or counterclockwise direction through 180° to re-orient a coil and/or pallet located thereon.

e. The Pallet

Where the coils being formed at the coil forming stations $CFS_1$ and $CFS_2$ are relatively small and thus dimensionally stable, they may be carried from one location to another directly on the roller table modules. However, where the coils are larger, as is frequently the case in modern mills, it may be necessary to provide a support means to insure that the coils are not distorted or toppled while in transit. To this end, pallets 48 of the type shown in FIG. 4 may be employed. The pallets 48 are the subject of a separate application assigned to the same assignee as that of the present application. Accordingly, only a brief description will be provided at this time.

The pallets 48 are each provided with a generally U-shaped base made up of laterally spaced leg members 49 forming a space "$s_2$" interconnected at their rearward ends by a bridging member 50. The upper surfaces 51 of the leg members are inclined downwardly from front to rear. Support posts 52 extend vertically relative to the upper surfaces 51. The support posts are braced by rearward brackets 53 which reset on and are removably attached to the bridging member 50. When loaded on the pallet 48, a coil C will have its bottom resting on the upper surfaces 51 of the leg members 49. The coil will be inclined slighty and will thus lean against the support posts 52. In this way, the coil will remain in a stable upstanding condition throughout its travel through the coil handling area. The near vertical attitude in which the coils are supported and carried imparts a considerable measure of vertical compaction developed by the weight of the coil itself. This desirable feature is in marked contrast to the prevalent distortions which coils undergo while being transported on the hooks of conventional hook carrier systems. The distance between the exterior sides of the leg members 49 is such that the pallets can readily move along the roller table modules $M_1$ and $M_2$, with the side channels 2 of the modules acting as guides.

f. Coil Forming Stations

Figure 2:
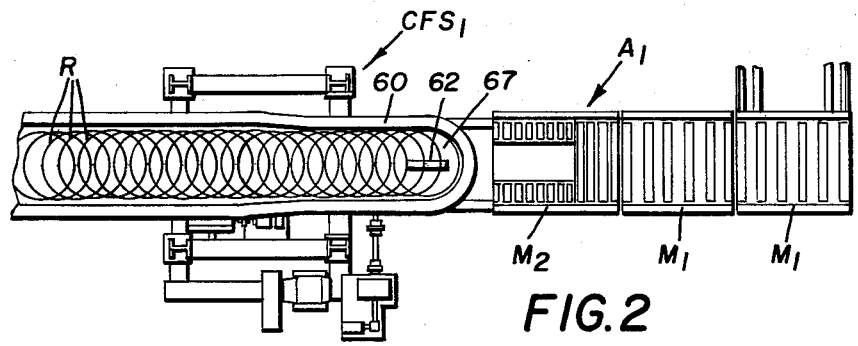
FIG. 2 is a plan view of a coil forming station.

The coil forming stations $CFS_1$ and $CFS_2$ are substantially identical, and hence only station $CFS_1$ will be described with reference to FIGS. 2 and 3.

The coil forming station is positioned to receive product rings "R" being carried in an overlapping Spencerian pattern on a delivery conveyor 60. The rings drop from the delivery end of the conveyor into a reforming chamber generally indicated at 61. The upper end of the chamber is formed as a housing 61' and the lower portion of the chamber is defined by vertical posts 61'. The chamber has an open side facing roller conveyor avenue $A_1$, the latter being made up of a roller table modules $M_2$, $M_1$. In FIGS. 2 and 3, another module $M_1$ on the transfer mechanism $TC_1$ is aligned with avenue $A_1$.

As the rings R drop into the chamber 61, they are collected around a mandrel 62 which is mounted for axial movement into and out of an underlying trunk 63. The trunk 63 forms part of a carriage assembly 63' which has wheels 64 arranged to run along tracks 65, the ends 65' of which are inclined downwardly at a location underlying the end roller table module $M_2$ of avenue $A_1$. The carriage assembly 63' is moved back and forth along the tracks 65 by any conventional mechanism, a portion of which is indicated generally at 66. A coil support plate 67 is carried by a separate elevator mechanism (shown only schematically at 68 in FIGS. 13A-13G) for vertical movement within the chamber 61 on mandrel 62. This type of apparatus is known to those skilled in the art, as evidenced by the disclosure in U.S. Pat. No. 3,648,736.

Figure 13A:
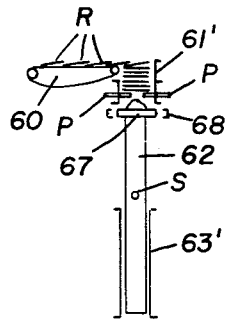
FIGS. 13A–13G are schematic illustrations showing the operation of the apparatus at the coil forming station.
Figure 13B:
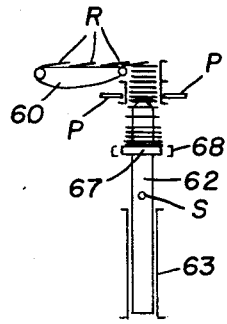
Figure 13C:
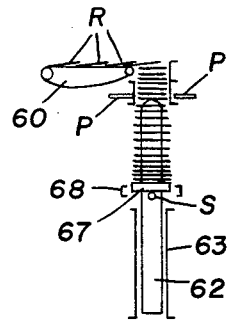
Figure 13D:
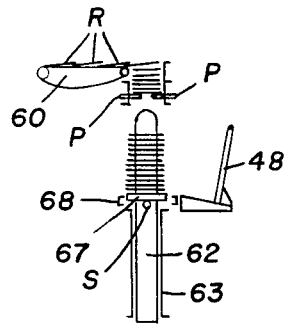
Figure 13E:
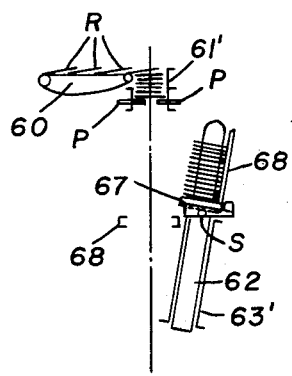
Figure 13F:
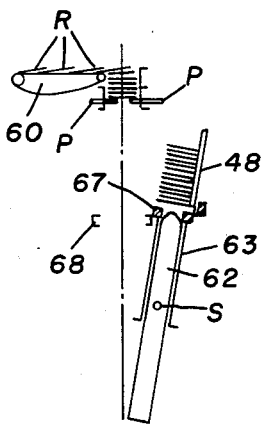
Figure 13G:
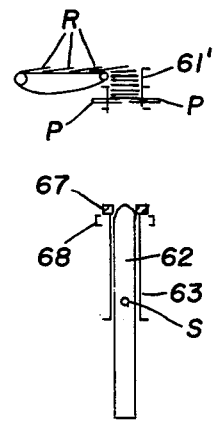

The operation of the coil forming station will be better understood by reference to FIGS. 13A-13G. More particularly, as shown in FIG. 13A, rings R are being delivered by conveyor 60 into the upper portion 61' of the reforming chamber where they are being accumulated temporarily on any convenient means, for example retractable support pins "p". The mandrel 62 is in its fully elevated position aligned axially with the center of the reforming chamber, and the coil support plate 67 is also fully raised on elevator 68. As shown in FIG. 13B, the support pins p at the upper portion of the reforming chamber 61' are then retracted allowing the rings temporarily accumulated thereon to fall over the mandrel onto the coil support plate 67. As indicated in FIG. 13C, the coil support plate 67 is thereafter gradually lowered by the elevator 68 as the coil forming operation proceeds to completion. In FIG. 13D, a completed coil has been formed around the mandrel 62 on the coil support plate 67, and the support pins p of the upper coil forming chamber portion 61' have again been inserted into the path of ring descent to temporarily accumulate further rings above the mandrel. At this point, the elevator 68 has been dropped free of the coil support plate 67 and the latter is now at rest on a stop "s" on the mandrel 62. A pallet 48 has been positioned on the adjacent roller table module $M_2$ to receive the thus-formed coil. Thereafer, as shown in FIG. 13e, the carriage assembly 63' is moved along the tracks 65 to the position indicated (also shown in dotted in FIG. 3). At this point, the coil is in position over the base of the pallet and at rest against the upstanding pallet support members 52. However, the bottom of the coil remains supported on the coil support plate 67. The inclination of the track ends 65' is such that the coil is inclined at the proper angle in relation to the upper inclined surfaces 51 of the pallet base. Referring next to FIG. 13F, it will be seen that the mandrel 62 is next fully retracted into the trunk 63 with the result that the stop s drops away from the coil support plate, resulting in the coil support plate being dropped through the space $s_2$ between the legs 49 of the pallet base and through the space $s_1$ of the roller table module $M_2$ where it comes to rest on the upper end of the trunk 63, and the mandrel is fully withdrawn from the coil. The result is that the coil is now deposited on and fully supported by the pallet 48. Thereafter, and with reference to FIG. 13G, the carriage assembly 63' is pulled back along the tracks 65 into line with the axis of the coil forming chamber preparatory to returning all of the components to the condition shown in FIG. 13A. The cycle is then repeated while the coil on pallet 48 is removed laterally by energizing the motors powering the roller table modules $M_2$ and $M_1$ of conveyor avenue $A_1$.

g. Coil Inverter

The coil inerter CI shown in FIG. 1A will now be described further with reference to FIGS. 14-16 and 17A-17K. This apparatus is also the subject of another application assigned to the same assignee as that of the present application.

Figure 14:
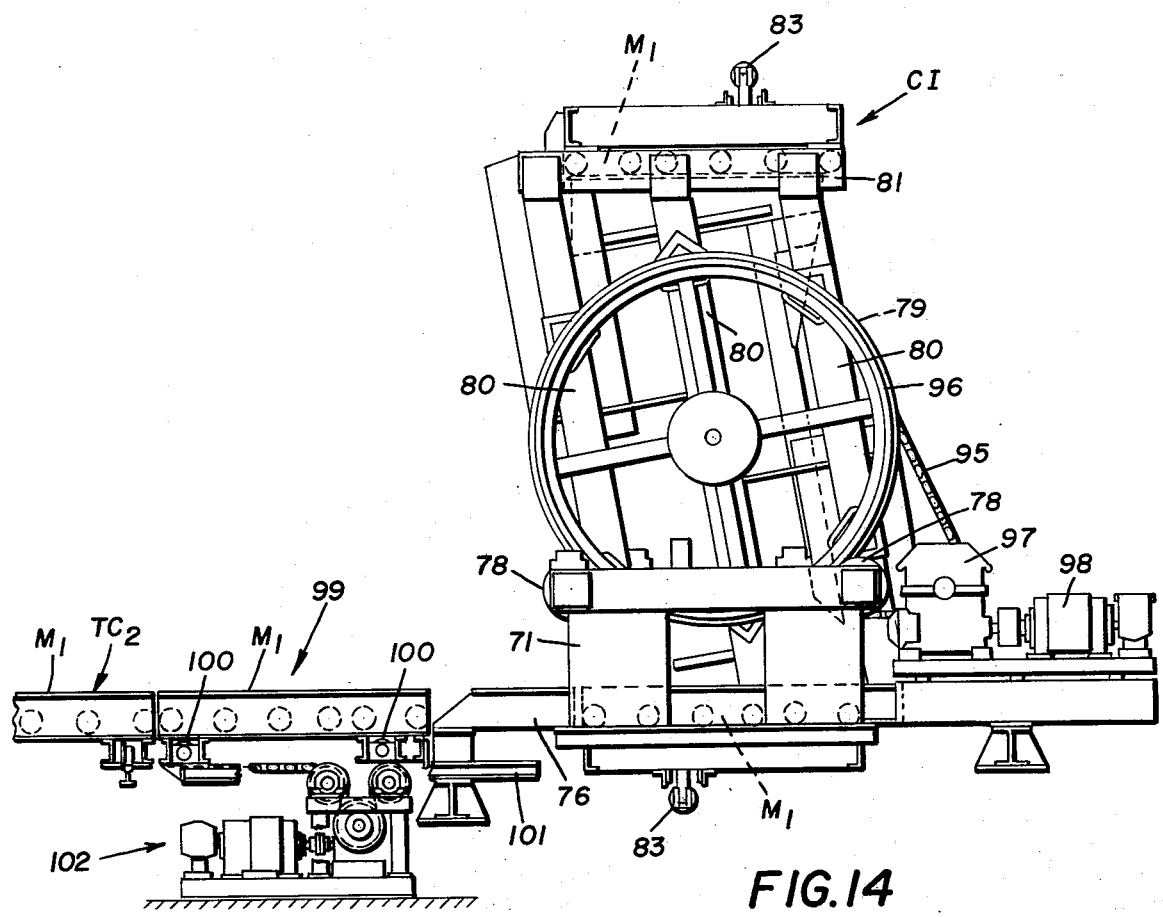
FIG. 14 is a side elevational view of the coil inverter.
Figure 15:
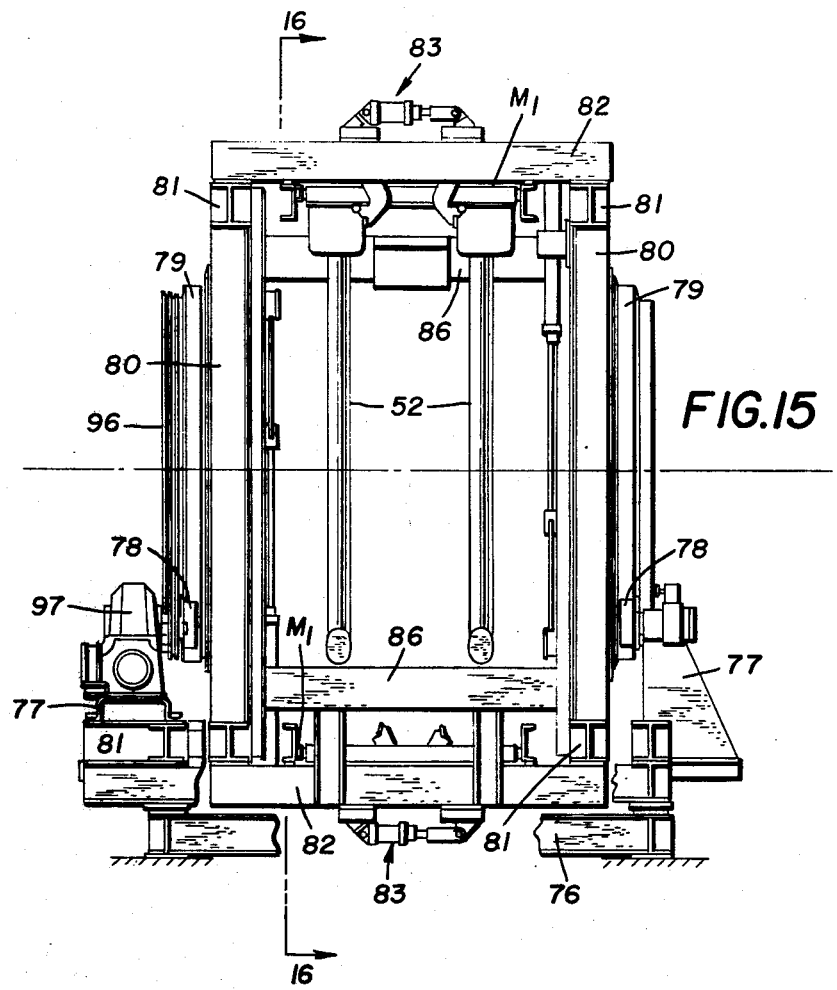
FIG. 15 is an end elevation of the coil inverter.
Figure 16:
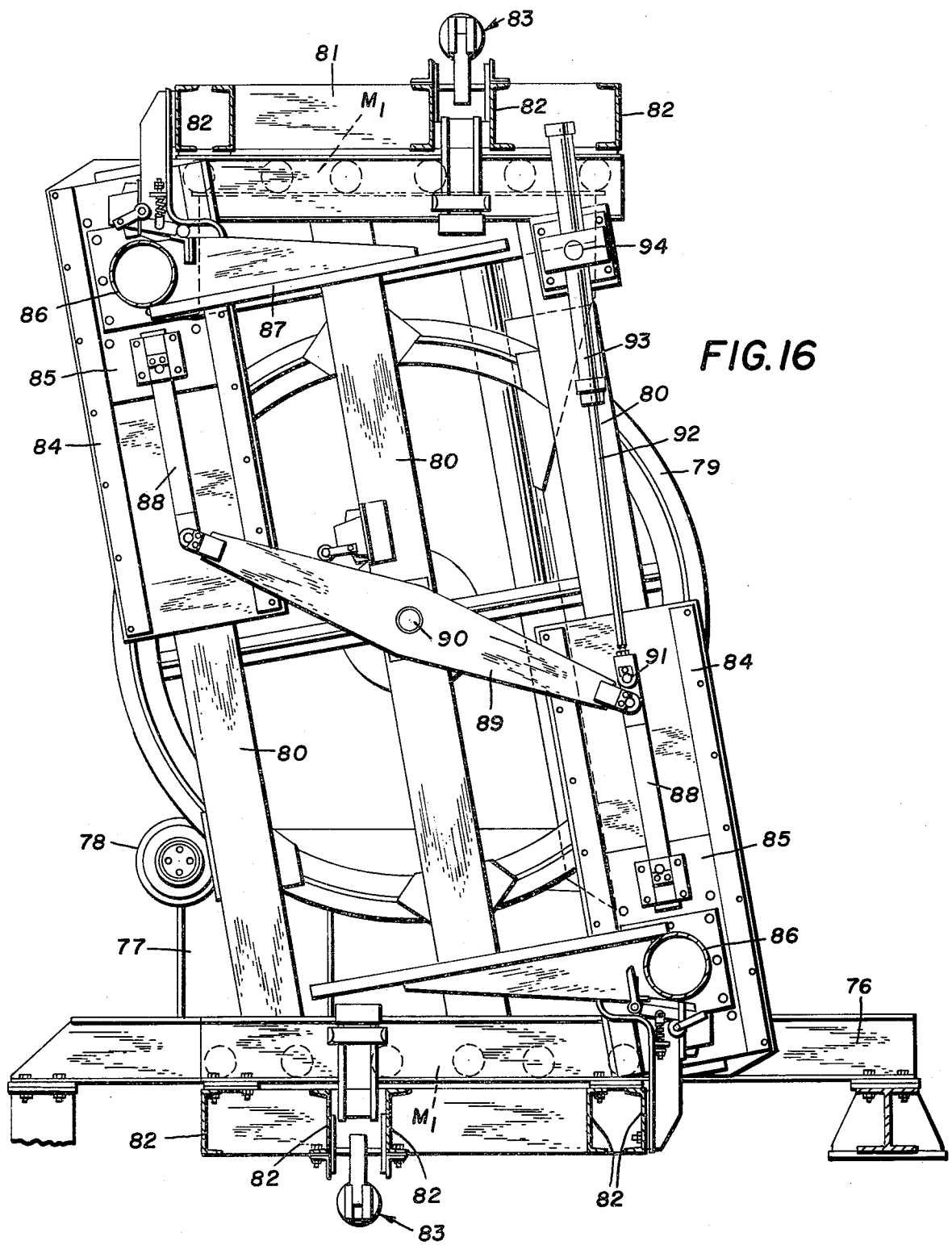
FIG. 16 is a sectional view on an enlarged scale taken along lines 16—16 of FIG. 15.

With reference initially to FIGS. 14-16, it will be seen that the inverter includes a base 76 having opposed pedestals 77 on which are mounted rollers 78. The rollers support opposed circular tracks 79 to which are attached side frames having vertical members 80 interconnected at their opposite ends by transverse braces 81. The braces are in turn connected by cross-members 82 which have mounted thereon roller table modules $M_1$. Certain of the cross members 82 also carry pallet clamping mechanisms 83.

Inwardly facing guide assemblies 84 (see FIG. 16) are mounted on the endmost vertical members 80. These guide assemblies contain slide members 85 which are interconnected by tubular cross-pieces 86. The tubular cross-pieces 86 support opposed tongues 87. The slides 85 on each side of the inverter are connected by links 88 to a lever 89 which is rotatably supported as at 90. One of the links 88 is connected as at 91 to the piston rod 92 of a cylinder 93 pivotally supported as at 94.

The inverter is rotated by means of a chain 95 which extends around a circular chain guide 96 mounted adjacent to one of the tracks 79. The chain is engaged by the drive sprocket of a gear reducer 97 which is powered by a motor 98.

A feed car 99 has a roller table module $M_1$ mounted thereon. The feed car has rollers 100 which run along short tracks 101. The feed car is moved in opposite directions along the tracks 101 by means of a chain drive generally indicated at 102.

Figure 17G:
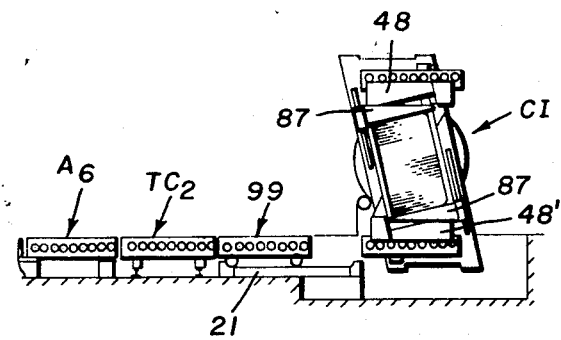
Figure 17H:
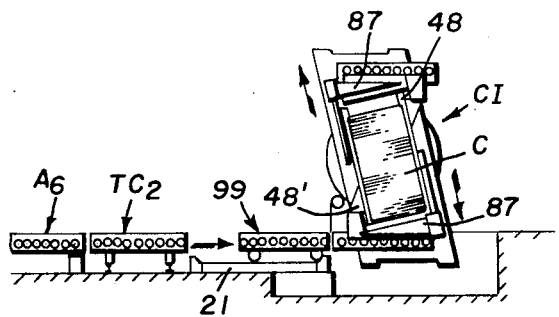
Figure 17I:
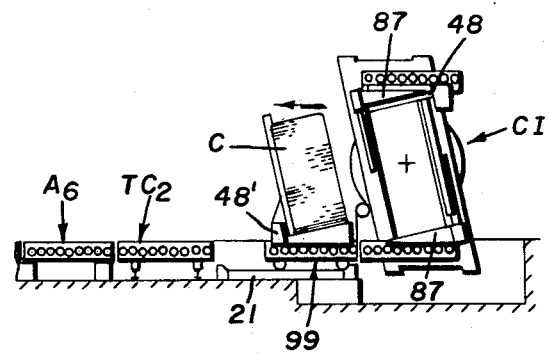
Figure 17J:
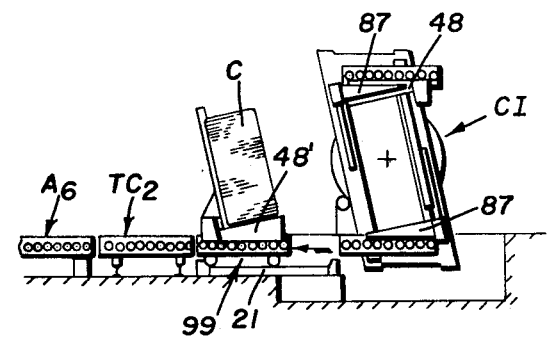
Figure 17K:
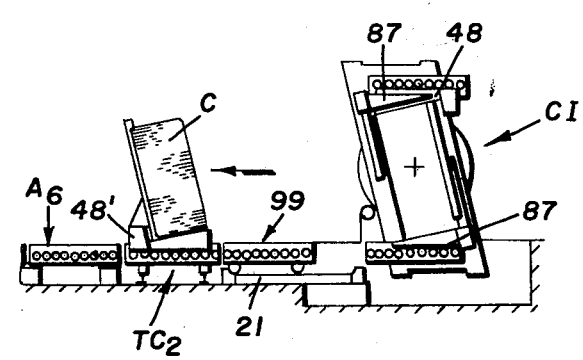

The operation of the coil inverter will now be described with reference to FIGS. 17A-17K. As shown in FIG. 17A, a pallet 48 with a coil C supported thereon has been delivered by the transfer car mechanism $T_2$ to a position in alignment with conveyor avenue $A_6$. At this location, the loaded pallet is directly adjacent to the feed car 99. An empty pallet 48' is clamped in an inverted position in the coil inverter by one of the pallet clamping mechanisms 83. As shown in FIG. 17B, the roller table modules of the transfer car mechanism $TC_2$ and the feed car 99 are then energized to shift the loaded pallet onto the feed car 99. Thereafter, as shown in FIG. 17C, the feed car is moved along the tracks 21 to a position directly adjacent to the coil inverter. Then, as shown in FIG. 17D, the roller table module of the feed car 99 and the lower module of the inverter are energized to shift the loaded pallet into the coil inverter where it is clamped in position on the inverter's lower table roller module by the lowermost pallet clamping mechanism 83. This having been accomplished, and as shown in FIG. 17E, the cylinders 93 are actuated to move the tongues 87 together to clamp the coil therebetween. This has the effect of raising the coil off to the lower pallet 48. The coil is thus axially confined between the two tongues 87 and radially confined by the support posts of the two pallets 48, 48'. The center of gravity of the coil is thus centered approximately at the axis of rotation of the inverter. At this stage, the feed car 99 is also returned to its original position adjacent to the transfer car mechanism $TC_2$. Once this has been accomplished, and as shown in FIG. 17F, the motor 98 is energized to rotate the inverter and the coil contained therein through 180°. This results in an inversion of the coil to a position shown in FIG. 17G. Thereafter, as shown in FIGS. 17F, the tongues 87 are retracted and the feed car 99 is returned to a position adjacent to the inverter. Retraction of the tongues 87 causes the coil to be redeposited on the pallet 48' which is in turn mounted on the inverter's lowermost roller table module $M_1$. The pallet clamping mechanism 83 is then disengaged from pallet 48' and the underlying roller table module is energized to move the coil out of the inverter and back onto the feed car 99. Thereafter, as shown in FIG. 17H, the feed car is moved back along tracks 21 to a position adjacent to the transfer car mechanism $TC_2$. Finally, as shown in FIG. 17K, the roller table modules of the feed car 99 and the transfer car $TC_2$ are energized to move the loaded pallet 48' onto the transfer car $TC_2$, thus completing the coil inversion process.

h. Compacting Mechanism

With reference to FIG. 1B, it will be seen that the system herein being employed for illustrative purposes includes three compacting mechanisms $C_1C_3$. The design, construction and operation of each is identical, and hence only one ($C_1$) will be described with further reference to FIGS. 20, 21 and 22A–H. This description will be abbreviated, since the compacting mechanism is the subject of a separate application assigned to the same assignee as that of the present application.

Figure 20:
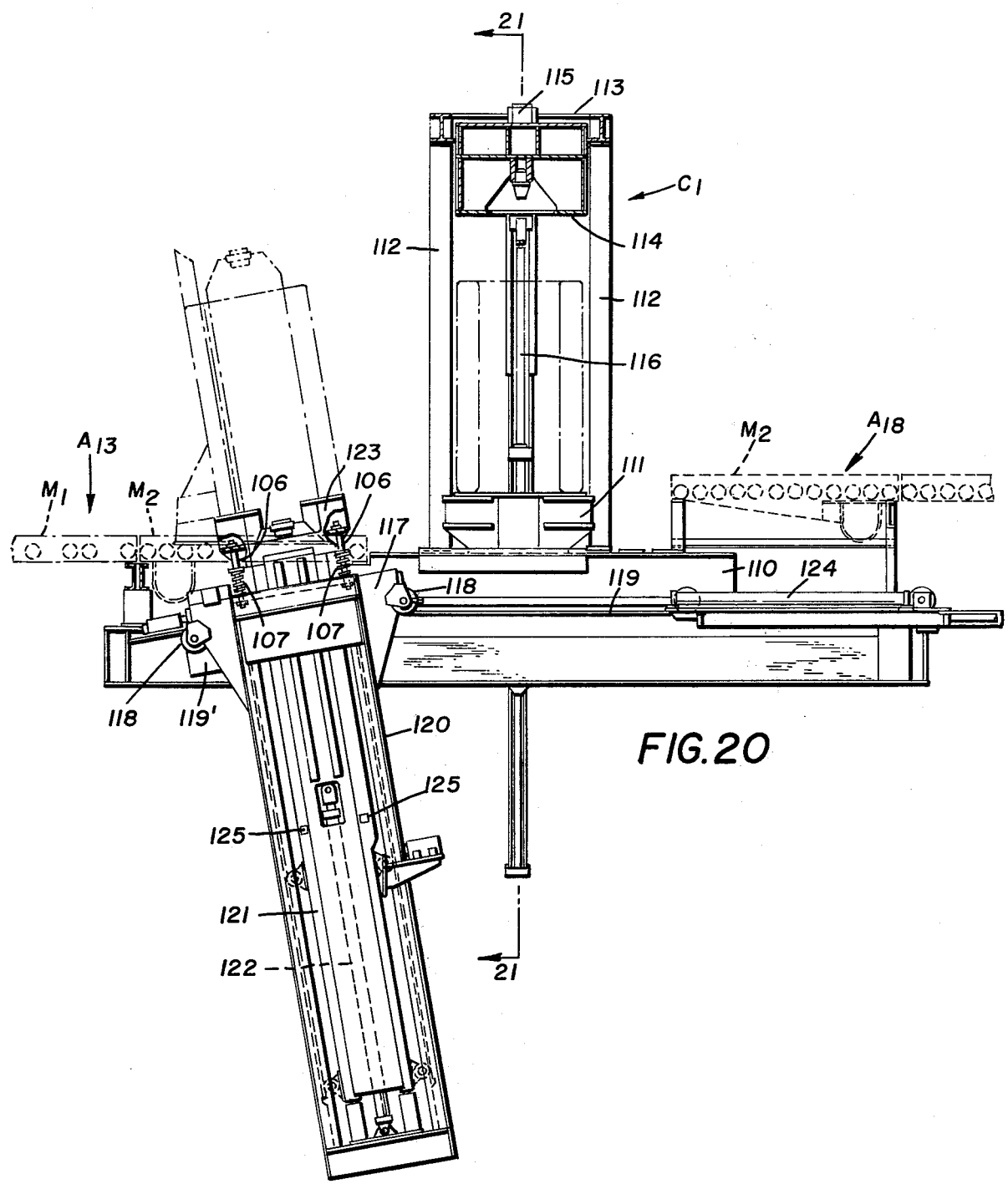
FIG. 20 is a side view of a compacting mechanism.
Figure 21:
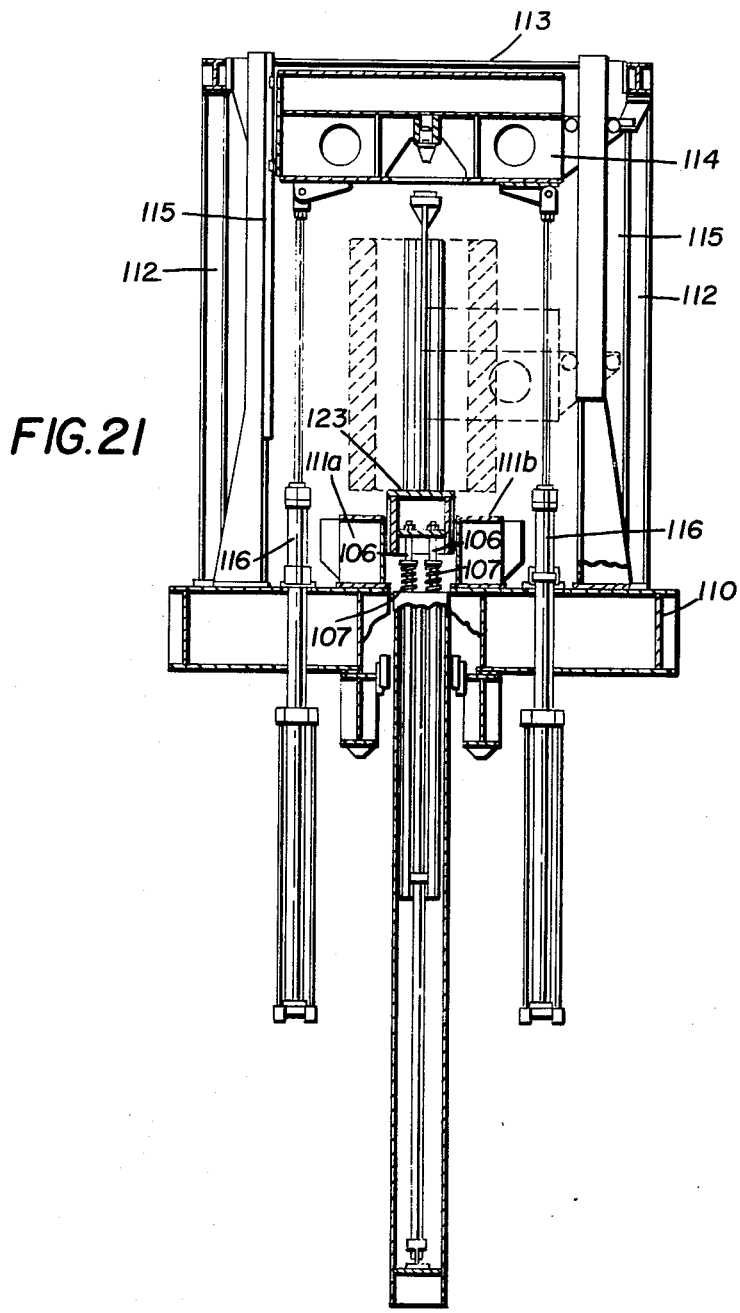
FIG. 21 is a sectional view of the compacting mechanism taken along lines 21—21 of FIG. 20; and, FIGS. 22A–22H are schematic views showing the operation of the compacting mechanism.

With reference now to FIGS. 20 and 21, the compacting mechanism $C_1$ is located between the two roller conveyor avenues $A_{13}$ and $A_{18}$, which terminate adjacent to the compacting mechanism at oppositely disposed roller table modules $M_2$. The compacting mechanism includes a base 110 on which is mounted a base platen 111 which is divided into two laterally spaced sections 111a and 111b (See FIG. 21). Posts 112 extend vertically from the base 110. The posts 112 support a head 113 beneath which is located a vertically movable top platen 114. The top platen 114 reciprocates vertically on guides or tracks 115 under the influence of piston-cylinder units 116.

A carriage assembly 117 is located beneath the level of base platen 111. The carriage assembly has wheels 118 arranged to run along tracks 119 which have inclined portions 119' located beneath the end roller table module $M_2$ of avenue $A_{13}$. The carriage assembly 117 has a depending trunk 120 slidably containing an axially movable mandrel 121. The mandrel is operated by a piston-cylinder unit 122 supported at the base of the trunk. The mandrel 121 extends axially through a coil supporting head assembly 123 which is also mounted for limited vertical movement by means of guide rods 106 and 107 on the carriage assembly 117. The carriage assembly is moved back and forth along tracks 119 by means of a piston-cylinder assembly 124.

Figure 22A:
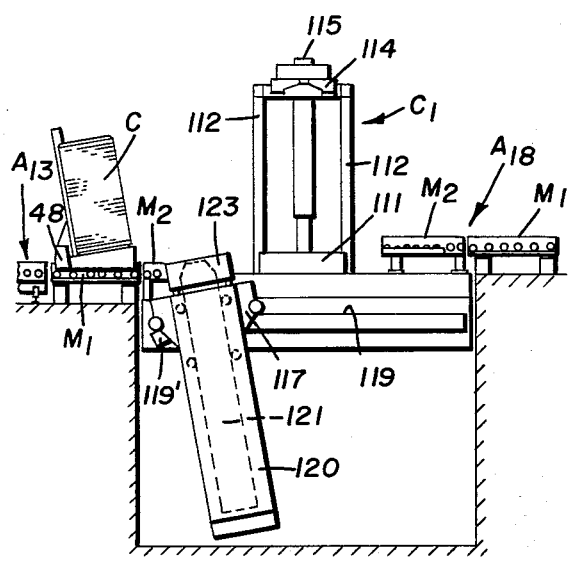
Figure 22B:
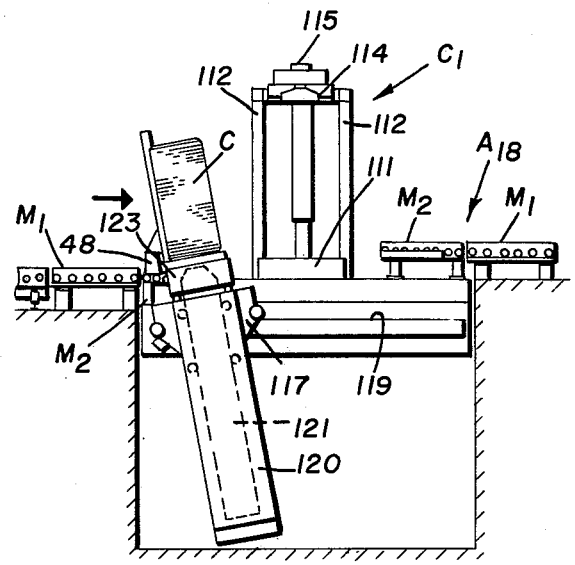

With reference now to FIGS. 22A–22H, it will be seen that the compacting mechanism operates in the following manner: at the operational stage shown in FIG. 22A, a coil C supported on a pallet 48 has been delivered along conveyor avenue $A_{13}$ to a roller table module $M_1$ which is directly adjacent to the end roller table module $M_2$. The carriage assembly 117 has been moved along tracks 119 to a location beneath the end module $M_2$ of conveyor avenue $A_{13}$, and the depending trunk 120 is inclined due to the fact that the carriage wheels are partially supported by the inclined portion 119' of the track 119. FIG. 22B depicts the next operational stage which involves energizing both the roller table module $M_1$ supporting the loaded pallet 48 and module $M_2$ to transfer the loaded pallet onto the roller table module $M_2$ of avenue $A_{13}$. This places the loaded pallet 48 over the carriage assembly 117 with the eye of the coil C aligned axially with the underlying inclined mandrel 121.

Figure 22C:
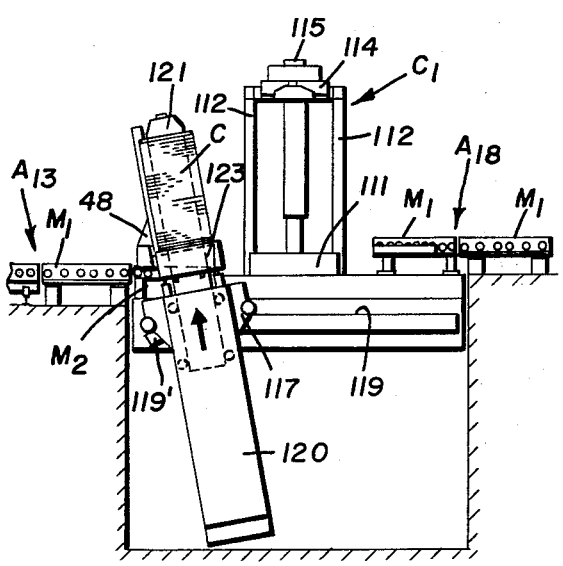
Figure 22D:
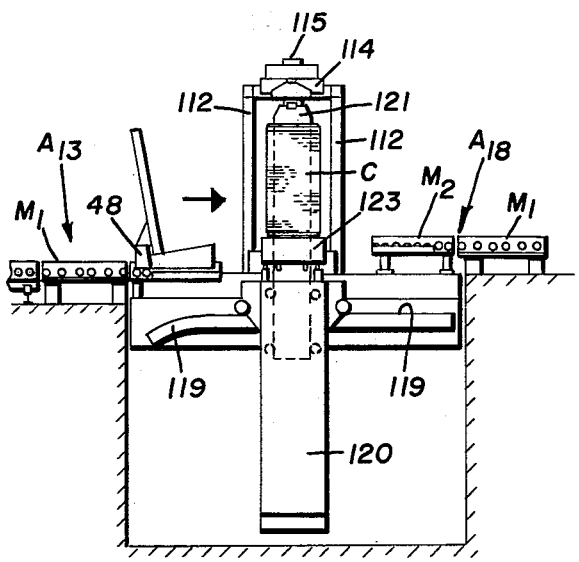

Referring now to FIG. 22C, it will be seen that the mandrel 121 is next elevated axially and is thus inserted through the coil C. The last portion of the upward mandrel travel causes the coil supporting head assembly 123 to be raised by stops 125 on the mandrel (see FIG. 20) with the result that the coil C is elevated by the head assembly 123 off of the base of the pallet 48. Accordingly, at the end of this stage, the coil C is completely supported on the mandrel 121 and head assembly 123. Referring next to FIG. 22D, which corresponds in operational sequence to FIG. 21, it will be seen that the carriage assembly 117 is moved along tracks 119 to a position underlying the top platen 114. The space between the two sections 111a, 111b of base platen 111 accommodates movement therebetween of the raised mandrel 121 and head assembly 123. At this stage, the coil C remains supported from beneath on the head assembly 123, the latter being elevated slightly above the base platen 111.

Figure 22E:
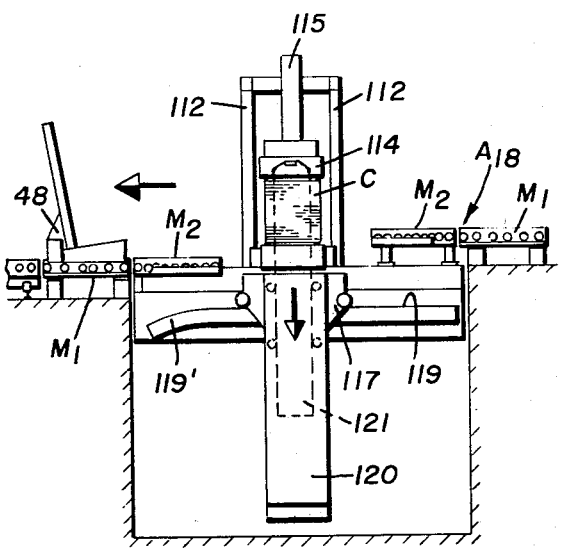
Figure 22F:
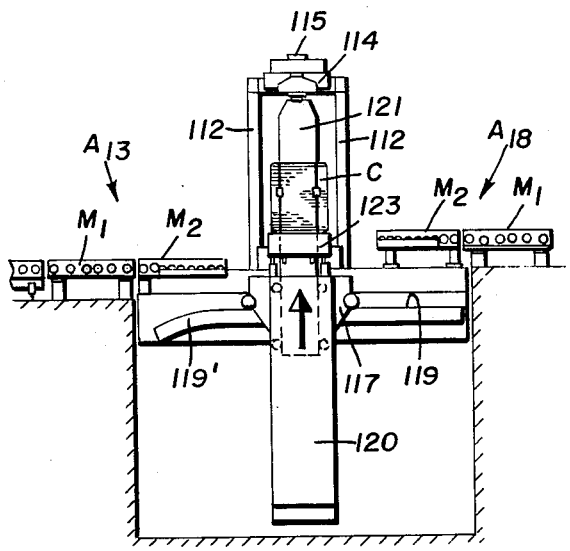

As is next shown in FIG. 22E, axial compaction of the coil C is accomplished by lowering the top platen 114. As the top platen 114 is lowered, the mandrel 121 is axially withdrawn with the result that the coil supporting head assembly 123 is dropped slightly into horizontal alignment with the bottom platen 111. The net result is an axial compaction of the coil C between platens 114 and 111 while the coil is supported axially by the mandrel 121. While this operation is taking place, the end modules $M_1$ and $M_2$ of avenue $A_{13}$ are energized to laterally remove the unloaded pallet 48. With the coil thus fully compacted, a plurality of retaining bands are applied. This can be accomplished automatically by suitable banding apparatus (not shown), or it can be accomplished manually. Referring next to FIG. 22F, after the banding operation has been completed, the upper platen 114 is returned to its raised position and this is accomplished by an elevation of the mandrel 121 and the coil supporting head assembly 123 to the positions shown in FIG. 22F. It will thus be understood that at this point, the compacted banded coil C is again totally supported on the coil supporting head assembly 123 and the mandrel 121.

Figure 22G:
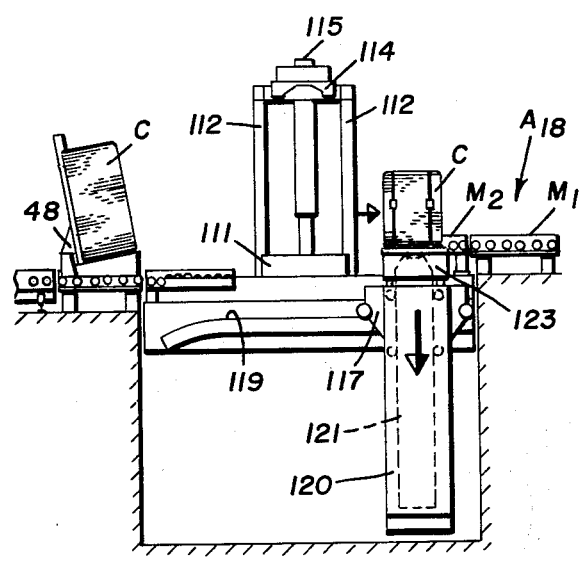
Figure 22H:
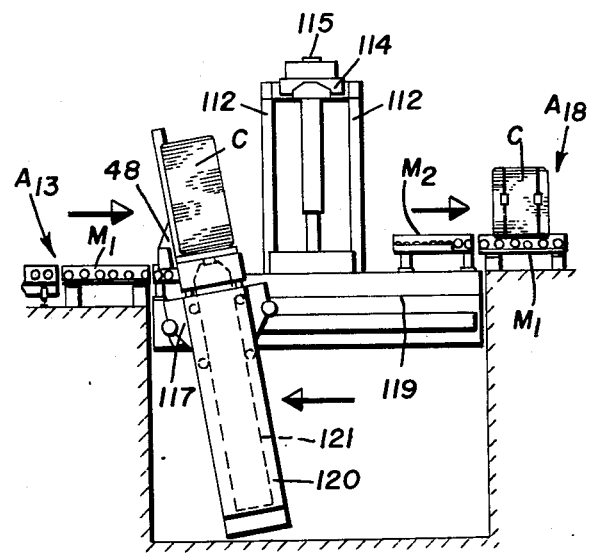

Thereafter, as shown in FIG. 22G, the carriage assembly 117 is moved along tracks 119 to a position underlying the end module $M_2$ of avenue $A_{18}$. This having been accomplished, the mandrel 121 is fully retracted with the result that the compacted banded coil is deposited on the underlying module $M_2$. Finally, with reference to FIG. 22H, it will be seen that the modules $M_2$ and $M_1$ of avenue $A_{18}$ are energized to move the coil away from the coil compacting mechanism while the carriage assembly 117 and its associated components are returned along tracks 119 to pick up another coil on the opposite side of the compacting mechanism.

i. System Operation

Having thus described the principal components of the overall system as shown in FIGS. 1A–1C, the system operation will now be reviewed. It will be understood that if the coils being formed are relatively small and thus stable during transit, there will be no need for pallets. However, where pallets are required due to the large size of the coils, then it will be further understood that for any given system of the type herein being considered, there will be a number of pallets dispersed at various locations. Some pallets will be loaded with coils, while other empty pallets will be enroute back to the coil forming stations. A single coil of the larger type requiring pallets will now be followed as it passes through the system.

The coil begins at one of the coil forming stations, either $CF_1$ or $CF_2$. Assuming for purposes of this discussion that the coil is formed at station $CF_1$, after formation the coil will be shifted in the manner previously described in connection with FIGS. 13A–13G onto the endmost module $M_2$ of conveyor avenue $A_1$.

The transfer car mechanism $TC_1$ will have been shifted to a position placing one of its roller table modules $M_1$ in alignment with conveyor avenue $A_1$. The loaded pallet will then be shifted onto the transfer car mechanism $TC_1$, after which the transfer car mechanism will be shifted back to the position shown in FIG. 1A. The roller table module supporting the loaded pallet will then be energized to move the pallet along avenue $A_5$ to an appropriate location, for example $L_1$, at which the loaded pallet will be momentarily held while operating personnel inspect and trim the uppermost rings of the coil. These rings comprise the rolled tail front end of the billet. It will be understood that because the individual roller tables modules $M_1$ are each separately powered, the motion of the loaded pallet along any particular avenue can be remotely controlled, thus making it possible to stop and start a particular pallet at any given time. After the top of the coil has been inspected and trimmed, the loaded pallet will be moved onto the roller table module $M_1$ carried by transfer car mechanism $TC_2$. Transfer can mechanism $TC_2$ will then be shifted into alignment with conveyor avenue $A_6$. Thereafter, as previously described in connection with FIGS. 17A–17K, the coil will be fed into the coil inverter CI, inverted, and retracted back onto transfer car mechanism $TC_2$. This having been accomplished, the transfer car mechanism $TC_2$ will be brought back into alignment with roller conveyor avenue $A_5$ and the appropriate roller table modules will be energized to move the coil to a second location, for example $L_2$, where the uppermost rings of the inverted coil, which comprise the front end of the billet, are also trimmed. At this point in time, the results of the sampling previously taken at location $L_1$ will become available and if these results show that additional rings should be removed from the bottom of the now inverted coil, then the coil will be moved to transfer car mechanism $TC_3$ and the latter will be shifted into alignment with conveyor avenue $A_6$ for the purpose of returning the coil to the coil converter CI. Re-inversion of the coil would then be accomplished in order to expose the appropriate coil end for additional trimming. This can be repeated any number of times until the sampling procedures indicate that the coil has been properly trimmed. If need be, a number of coils requiring reinversion may be stored along avenue $A_6$.

Should the results of the sampling previously taken show that sufficient material has been trimmed from the coil, then the coil will be moved onto the turntable mechanism $T_1$ and the latter will be operated to rotate the coil and its supporting pallet through 180°. The purpose of this rotation is to orient the pallet with the open end of its base facing towards the compacting mechanisms. This having been accomplished, the coil will be moved further along conveyor avenues $A_5$ onto the transfer car mechanism $TC_4$. The four-module width of transfer car mechanism $TC_4$ will accommodate the receipt thereon of four loaded pallets. This having been accomplished, the loaded modules of the transfer car mechanism $TC_4$ will be shifted into alignment with one of the avenues $A_7$, $A_9$ or $A_{11}$ which are arranged to feed the three compacting mechanisms. For purposes of this discussion, it will be assumed that the compacting mechanism $C_1$ will be employed, and hence no shifting of transfer car mechanism $TC_4$ will be required. Rather, the roller table modules of $TC_4$ will be energized to shift the loaded pallets onto roller conveyor avenue $A_7$. Individual coils and their respective supporting pallets will then be shifted across transfer car mechamism $TC_5$ onto avenue $A_{13}$. From this point, the coils will be transferred in the manner previously described in connection with FIGS. 22A–22H through the compacting mechanism $C_1$ for the purpose of compacting and banding the coils. The compacted bamded coils will continue along avenue $A_{18}$ onto transfer car mechanism $TC_8$. Transfer car mechanism $TC_8$ will then be shifted into alignment with conveyor avenue $A_{19}$ which is arranged to transport the coils to their final destination at coil transfer station CTS. At this location, the banded coils are down-ended and off-loaded onto appropriate vehicles such as for example railway cars.

The empty pallets are removed laterally from compacting mechanism $C_1$ onto transfer car mechanism $TC_5$ the latter being thereafter shifted into alignment with conveyor avenue $A_8$. The roller table modules of conveyor avenue $A_8$ are then energized to return the empty pallets to the transfer car mechanism $TC_4$. When four such empty pallets are received on the transfer car mechanism $TC_4$, the latter is shifted into alignment with conveyor avenue $A_{20}$ and the appropriate roller table modules are energized to move the empty pallets towards turntable mechanism $T_2$. This turntable mechanism re-orients empty pallets through 180° in order to place the open ends of their bases facing towards the coil forming stations. The pallets are then shifted onto transfer car mechanism $TC_9$ which is then shifted laterally into alignment with conveyor avenue $A_4$. From here, the empty pallets are shifted onto transfer car mechanism $TC_1$ which can then be employed to deposit the empty pallets either on conveyor avenues $A_1$ or $A_2$ for immediate use at the coil forming station $CFS_1$ or $CFS_2$, or alternatively, the empty pallets can be shunted onto conveyor avenue $A_3$ where they are stored temporarily.

In light of the foregoing description, the advantages made possible by the present invention will now be appreciated by those skilled in the art. One such advantage lies in the fact that the entire coil handling area is uncluttered by overhead tracks, supporting structures, etc. which characterize conventional hook carrier systems. The coil handling area is open and accessible to overhead cranes, fork lift trucks, etc. This greatly facilitates access to and maintenance of the various coil handling devices such as the coil inverters and compacting mechanisms. Also, because the roller table modules are individually powered, they are readily adaptable to remote control from a central control station. The separate powering of the modules enables the coils and/or their supporting pallets to be moved, stopped, started, etc. to suit various operating conditions. Pallets, either empty or loaded, can be moved individually or in groups, momentarily stored, re-routed, etc. The inherent flexibility of the system is thus seen to be highly advantageous.

Another advantage of the present system is that the coils are maintained in an upstanding vertical or near vertical condition (depending on whether or not pallets are employed) while being moved through the coil handling area. This eliminates the coil distortion which characterize conventional hook carrier systems.

Maintenance is also simplified and economics of equipment are made possible by the removability and interchangeablity of the roller table modules. When a particular module requires servicing, it can be quickly replaced by a spare, and only a relatively few spares are required to service the entire system. The system is adaptable to the handling of all sizes of coils. Smaller coils can be handled without employing support pallets. However, where pallets are required, they are easily accommodated.

It is my intention to cover all changes and modifications of the embodiment herein chosen for purposes of disclosure which do not depart from the spirit and scope of the invention.

I claim:

1. An apparatus for transporting upstanding cylindrical product coils between stations employing coil transfer mandrels, said apparatus comprising: a plurality of separately driven roller table modules aligned to form longitudinally extending roller conveyor avenues, the roller table modules adjacent to said stations having laterally arranged rollers defining first open ended spaced therebetween; pallets having base sections with laterally spaced leg members defining second open ended spaces therebetween, said second open ended spaced being arranged for vertical alignment with said first open ended spaces to accept the coil transfer mandrels when said pallets are located adjacent to said stations, support members extending upwardly from said leg members to provide lateral support for coils deposited thereon, said base sections being adapted for movement on said roller table modules along said roller conveyor avenues; and, transfer means for laterally shifting certain of said roller table modules from one to another of said roller conveyor avenues.

2. The apparatus as claimed in claim 1 further characterized by the top surfaces of said leg members being inclined, said support members being normal to said top surfaces, thereby adapting said pallets to receive and carry the cylindrical product coils in an inclined attitude resting on said top surfaces and again said support members.

3. The apparatus as claimed in claim 1 wherein each of said roller table modules includes laterally spaced parallel side members, a plurality of rotatable table rollers extending transversally between said side members, and drive means for driving said table rollers in unison.

4. The apparatus as claimed in claim 1 wherein said transfer means is comprised of track members extending transversally between said avenues; carriage means mounted on said track members for movement along the length thereof, said carriage means being adapted to carry at least one of said roller table modules; and means for moving said carriage means in opposite directions along said track members.

5. The apparatus as claimed in claim 2 further characterized by turntable means adapted to support certain of said roller table modules, and means for rotating said turntable means when orienting pallets located on said certain roller table modules.

6. The apparatus as claimed in claim 3 wherein said roller table modules are arranged in a horizontal plane which is approximately at the floor level of the coil handling area, and wherein said drive means and said transfer means are located beneath said plane.

7. The apparatus as claimed in claim 6 wherein said roller table modules are readily removable and interchangeable to thereby facilitate maintenance thereof.

8. The apparatus as claimed in claim 1 further characterized by means along said path for inverting said coils.

9. The apparatus as claimed in claim 1 further characterized by means along said path for axially compacting said coils to facilitate the banding thereof.

10. The apparatus as claimed in claim 1 wherein said roller table modules and said transfer means are supported and driven by means located beneath the level of said path.

* * * * *